US009588258B2

(12) United States Patent
Alli et al.

(10) Patent No.: US 9,588,258 B2
(45) Date of Patent: *Mar. 7, 2017

(54) SILICONE HYDROGELS FORMED FROM ZERO DILUENT REACTIVE MIXTURES

(71) Applicant: Johnson & Johnson Vision Care, Inc., Jacksonville, FL (US)

(72) Inventors: Azaam Alli, Jacksonville, FL (US); Douglas G. Vanderlaan, Jacksonville, FL (US); James D. Ford, Orange Park, FL (US); Scott L. Joslin, Ponte Vedra Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 816 days.

This patent is subject to a terminal disclaimer.

(21) Appl. No.: 13/720,239

(22) Filed: Dec. 19, 2012

(65) Prior Publication Data

US 2014/0031449 A1   Jan. 30, 2014

Related U.S. Application Data

(60) Provisional application No. 61/579,690, filed on Dec. 23, 2011, provisional application No. 61/579,683, filed on Dec. 23, 2011.

(51) Int. Cl.
*G02B 1/04* (2006.01)
*C08F 283/12* (2006.01)
*C08F 290/06* (2006.01)
*C08G 77/442* (2006.01)

(52) U.S. Cl.
CPC .......... *G02B 1/043* (2013.01); *C08F 283/124* (2013.01); *C08F 290/068* (2013.01); *C08G 77/442* (2013.01)

(58) Field of Classification Search
CPC ..................................................... G02B 1/043
See application file for complete search history.

(56) References Cited

U.S. PATENT DOCUMENTS

| 3,408,429 | A | 10/1968 | Wichterle |
| 3,660,545 | A | 5/1972 | Wichterle |
| 4,113,224 | A | 9/1978 | Clark et al. |
| 4,136,250 | A | 1/1979 | Mueller et al. |
| 4,139,513 | A | 2/1979 | Tanaka et al. |
| 4,153,641 | A | 5/1979 | Deichert et al. |
| 4,197,266 | A | 4/1980 | Clark et al. |
| 4,246,389 | A | 1/1981 | LeBoeuf |
| 4,260,725 | A | 4/1981 | Keogh et al. |
| 4,495,313 | A | 1/1985 | Larsen |
| 4,810,764 | A | 3/1989 | Friends et al. |
| 4,837,289 | A | 6/1989 | Mueller et al. |
| 5,314,961 | A | 5/1994 | Anton et al. |
| 5,358,995 | A | 10/1994 | Lai et al. |
| 5,387,662 | A | 2/1995 | Kunzler et al. |
| 5,486,579 | A | 1/1996 | Lai et al. |
| 5,712,327 | A | 1/1998 | Chang et al. |
| 5,998,498 | A | 12/1999 | Vanderlaan et al. |
| 6,020,445 | A | 2/2000 | Vanderlaan et al. |
| 6,367,929 | B1 | 4/2002 | Maiden et al. |
| 6,602,930 | B2 | 8/2003 | Imafuku |
| 6,762,264 | B2 | 7/2004 | Kunzler et al. |
| 6,867,245 | B2 | 3/2005 | Iwata et al. |
| 6,902,812 | B2 | 6/2005 | Valint, Jr. et al. |
| 6,943,203 | B2 | 9/2005 | Vanderlaan et al. |
| 7,722,808 | B2 | 5/2010 | Matsuzawa et al. |
| 7,934,830 | B2 | 5/2011 | Blackwell et al. |
| 8,367,746 | B2 | 2/2013 | Manesis et al. |
| 8,937,110 | B2 * | 1/2015 | Alli .................................. 520/1 |
| 8,937,111 | B2 * | 1/2015 | Alli ............................. 523/107 |
| 9,125,808 | B2 * | 9/2015 | Alli ........................ G02B 1/043 |
| 9,140,825 | B2 | 9/2015 | Alli et al. |
| 9,156,934 | B2 | 10/2015 | Alli et al. |
| 9,244,197 | B2 | 1/2016 | Alli et al. |
| 2001/0044482 | A1 | 11/2001 | Hu et al. |
| 2002/0016383 | A1 | 2/2002 | Iwata et al. |
| 2002/0107324 | A1 | 8/2002 | Vanderlaan et al. |
| 2004/0039077 | A1 | 2/2004 | Baba et al. |
| 2004/0209973 | A1 | 10/2004 | Steffen et al. |
| 2006/0063852 | A1 | 3/2006 | Iwata et al. |
| 2006/0187410 | A1 | 8/2006 | Sato et al. |
| 2006/0229423 | A1 | 10/2006 | Parakka et al. |

(Continued)

FOREIGN PATENT DOCUMENTS

| CN | 1218816 A | 6/1999 |
| CN | 1409829 A | 4/2003 |

(Continued)

OTHER PUBLICATIONS

PCT International Search Report, dated Apr. 18, 2013, for PCT Int'l Appln. No. PCT/US2012/070890.
Barton, Allan F. M., Tables 13-15, CRC Handbook of Solubility Parameters and Other Cohesion Parameters, 1983, pp. 85-87, 1, CRC Press, Inc., Boca Raton, Florida.
Crivello, et al, Photoinitiators for Free Radical Cationic & Anionic Photopolymerisation, 2nd Edition, vol. III, pp. 275-298, John Wiley and Sons, New York, 1998.
International Preliminary Report on Patentability, dated Jun. 24, 2014 for PCT Int'l Appln. No. PCT/US2012/070879.
Lai, et al, The Role of Ionic Hydrophilic Monomers in Silicone Hydrogels for Contact Lens Application, PMSE Proceedings, ACS National Meeting, Apr. 13-17, 1997, pp. 34, vol. 76, San Francisco, CA.
Moad et al, The Chemistry of Radical Polymerization, 2nd Edition, 2006, pp. 472-479, 488-489, 508-514.
PCT International Preliminary Report on Patentability, dated Jun. 24, 2014, for PCT Int'l Appln. No. PCT/US2012/070890.
PCT International Preliminary Report on Patentability, dated Jun. 24, 2014, for PCT Int'l Appln. No. PCT/US2012/070895.

(Continued)

*Primary Examiner* — Michael Pepitone

(57) ABSTRACT

The present invention relates to silicone hydrogels having a desirable balance of properties which can be formed without diluents. The silicone hydrogels are formed from reactive mixtures comprising at least one hydroxyl substituted, monofunctional polydialkylsiloxane monomer having between 2 and 120 dialkylsiloxane repeating units, at least one slow reacting hydrophilic monomer and at least one hydroxyl containing hydrophilic monomer.

46 Claims, 3 Drawing Sheets

(56) References Cited

U.S. PATENT DOCUMENTS

| | | | |
|---|---|---|---|
| 2007/0066706 A1 | 3/2007 | Manesis et al. | |
| 2007/0138692 A1 | 6/2007 | Ford et al. | |
| 2008/0234457 A1 | 9/2008 | Zhou et al. | |
| 2009/0060981 A1 | 3/2009 | Chauhan | |
| 2009/0111905 A1 | 4/2009 | Kindt-Larsen et al. | |
| 2010/0014047 A1 | 1/2010 | Chang et al. | |
| 2010/0048847 A1 | 2/2010 | Broad | |
| 2010/0249356 A1 | 9/2010 | Rathore | |
| 2010/0280146 A1 | 11/2010 | Vanderlaan et al. | |
| 2011/0046332 A1 | 2/2011 | Breiner et al. | |
| 2011/0085128 A1* | 4/2011 | Liu ................. | B29D 11/00038 351/159.34 |
| 2011/0230589 A1 | 9/2011 | Maggio | |
| 2011/0237766 A1 | 9/2011 | Maggio et al. | |
| 2011/0275734 A1 | 11/2011 | Scales et al. | |
| 2012/0214899 A1 | 8/2012 | Lee et al. | |
| 2012/0216488 A1 | 8/2012 | Liu et al. | |
| 2012/0216489 A1 | 8/2012 | Lee et al. | |
| 2012/0218509 A1 | 8/2012 | Back et al. | |
| 2012/0219387 A1 | 8/2012 | Atkinson et al. | |
| 2012/0220688 A1 | 8/2012 | Wang et al. | |
| 2012/0220689 A1 | 8/2012 | Yao et al. | |
| 2012/0220743 A1 | 8/2012 | Francis et al. | |
| 2012/0220744 A1 | 8/2012 | Liu et al. | |
| 2013/0217620 A1 | 8/2013 | Alli et al. | |
| 2014/0031447 A1 | 1/2014 | Alli et al. | |
| 2015/0011672 A1 | 1/2015 | Alli et al. | |
| 2015/0369961 A1 | 12/2015 | Alli et al. | |
| 2016/0033682 A1 | 2/2016 | Alli et al. | |
| 2016/0103248 A1 | 4/2016 | Alli et al. | |

FOREIGN PATENT DOCUMENTS

| | | |
|---|---|---|
| CN | 101065686 A | 10/2007 |
| CN | 101163991 A | 4/2008 |
| CN | 101454144 A | 6/2009 |
| CN | 101542321 A | 9/2009 |
| CN | 101568857 A | 10/2009 |
| CN | 100578263 C | 1/2010 |
| CN | 101970516 A | 2/2011 |
| CN | 102171589 A | 8/2011 |
| CN | 102378783 A | 3/2012 |
| WO | 0170837 A1 | 9/2001 |
| WO | 03022321 A2 | 3/2003 |
| WO | 03022322 A2 | 3/2003 |
| WO | 2004081105 A2 | 9/2004 |
| WO | 2006026474 A2 | 3/2006 |
| WO | 2008054667 A1 † | 5/2008 |
| WO | 2008061992 | 5/2008 |
| WO | 2008116131 A2 | 9/2008 |
| WO | 2009058207 A1 | 5/2009 |
| WO | 2010078150 A1 | 7/2010 |
| WO | 2010147864 A2 † | 12/2010 |
| WO | 2011041523 A2 † | 4/2011 |
| WO | 2012118677 A1 | 9/2012 |
| WO | 2012118680 A1 | 9/2012 |
| WO | 2012118683 A1 | 9/2012 |

OTHER PUBLICATIONS

PCT International Preliminary Report on Patentability, dated Jun. 24, 2014, for PCT Int'l Appln. No. PCT/US2012/070899.
PCT International Preliminary Report on Patentability, dated Jun. 24, 2014, for PCT Int'l Appln. No. PCT/US2012/070906.
PCT International Search Report, dated Mar. 18, 2013, for PCT Int'l Appln. No. PCT/US2012/070879.
PCT International Search Report, dated Mar. 19, 2013, for PCT Int'l Appln. No. PCT/US2012/070895.
PCT International Search Report, dated Mar. 22, 2013, for PCT Int'l Appln. No. PCT/US2012/070906.
PCT International Search Report, dated May 13, 2013, for PCT Int'l Appln. No. PCT/US2012/070899.

* cited by examiner
† cited by third party

SILICONE HYDROGELS FORMED FROM ZERO DILUENT REACTIVE MIXTURES

RELATED APPLICATIONS

This application claims priority to U.S. Provisional Patent Application No. 61/579,690, filed on Dec. 23, 2011 entitled SILICONE HYDROGELS FORMED FROM ZERO DILUENT REACTIVE MIXTURES, and U.S. Provisional Patent Application No. 61/579,683, filed on Dec. 23, 2011 entitled SILICONE HYDROGELS HAVING A STRUCTURE FORMED VIA CONTROLLED REACTION KINETICS, the contents of which are incorporated by reference.

FIELD OF THE INVENTION

The present invention relates to silicone hydrogels having a desirable balance of properties which can be formed without diluents.

BACKGROUND OF THE INVENTION

Soft contact lenses made from silicone hydrogels contact lenses offer improved oxygen permeability as compared to soft lenses made from non-silicone materials such as poly(2-hydroxyethyl methacrylate) (HEMA). Initial efforts to make silicone hydrogel contact lenses were hampered by the poor wettability, high modulus, poor clarity, hydrolytic instability or the high cost of raw materials used to make many of these silicone hydrogels. While various solutions have proven somewhat successful for each of these deficiencies, there remains a need for silicone hydrogels that can be made from inexpensive commercially available monomers, and which have excellent wettability (without the need for surface modification), low modulus, good clarity, and desirable oxygen permeability.

Silicone hydrogels formulations containing polymeric wetting agents, such as poly(N-vinylpyrrolidone) (PVP) and acyclic polyamides have been disclosed. However, these polymers are quite large and require the use of special compatibilizing components, which need to be custom manufactured. Examples of compatibilizing components include 2-propenoic acid, 2-methyl-, 2-hydroxy-3-[3-[1,3,3,3-tetramethyl-1-[(trimethylsilyl)oxy]disiloxanyl]propoxy]propyl ester (SiGMA).

Monomeric N-vinylpyrrolidone (NVP) has also been incorporated into monomer mixes used to make a silicone hydrogel polymer, typically in amounts of about 25-55% (by weight) of the monomer mix. Such materials have been described in U.S. Pat. Nos. 4,136,250; 4,153,641; 4,260,725 and 6,867,245. The materials described in these references generally incorporate polyfunctional silicone monomers or macromers, that act as crosslinking agents, and thereby increase the modulus of the final polymer.

U.S. Pat. No. 4,139,513 discloses that 2-propenoic acid, 2-methyl-, 2-hydroxy-3-[3-[1,3,3,3-tetramethyl-1-[(trimethylsilyl)oxy]disiloxanyl]propoxy]propyl ester (SiGMA) can be used to form lenses from formulations comprising NVP and HEMA. SiGMA is the only source of silicone disclosed. However, because of the relatively low silicone content in those monomers, desirable levels of oxygen permeability in the final polymers are difficult to achieve.

US 2010/0048847 discloses silicone hydrogels made from a blend of a monomethacryloxyalkyl polydimethylsiloxane methacrylate with about 52% NVP, HEMA and TRIS. Diluents were disclosed to be necessary, and even using a blend of ethanol and ethyl acetate as a diluent, the polymers disclosed were (to varying degrees) hazy. Haziness was reduced by the addition of at least about 1.5% methacrylic acid (MAA).

Addition of anionic monomers such as MAA can, however, cause hydrolytic instability in silicone hydrogels, as was disclosed in "The role of ionic hydrophilic monomers in silicone hydrogels for contact lens application", Lai, Y., Valint, P., and Friends, G.; 213$^{th}$ ACS National Meeting, San Francisco, Apr. 13-17, 1997.

SUMMARY OF THE INVENTION

The present invention relates to a silicone hydrogel comprising, consisting and in some embodiments consisting essentially of about 8 to about 17 wt % silicon, an advancing contact angle of less than about 80° without surface modification formed from a reactive mixture comprising, consisting of, or consisting essentially of at least one monofunctional polydialkylsiloxane monomer having between 7 and 120 dialkylsiloxane repeating units and which may be optionally substituted with at least one hydroxyl group;

optionally one or more monofunctional, hydroxyl-containing siloxane monomer having less than 7 dialkylsiloxane repeating units, trialkyl siloxane groups or a combination thereof; with the proviso that if said monofunctional polydialkylsiloxane does not comprise at least one hydroxyl at least one monofunctional, hydroxyl-containing siloxane monomer is included;

about 40-about 60 wt % of at least one slow reacting hydrophilic monomer;

at least one hydroxyl containing hydrophilic monomer, wherein the molar ratio of hydroxyl containing components to the slow reacting hydrophilic monomer is between about 0.15 to about 0.4, wherein the reactive mixture is free of diluent.

The present invention further relates to a silicone hydrogel comprising, consisting of, or consisting essentially of between about 8 and about 17 wt % silicon, an advancing contact angle of less than about 80° without surface modification formed from a reactive mixture comprising, consisting of, or consisting essentially of at least one hydroxyl substituted, monofunctional polydialkylsiloxane monomer having between 2 and 120 dialkylsiloxane repeating units;

optionally one or more monofunctional siloxane monomer having 7 to 120 dialkylsiloxane repeating units, with the proviso that if said monofunctional, hydroxyl-containing siloxane monomer has less than 4 dialkylsiloxane repeating units or is of Formula IX

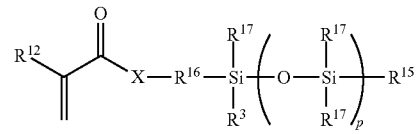

Wherein $R_3$, $R_{12}$, X, $R_{15}$, $R_{17}$ and p are as defined herein, at least one monofunctional, siloxane monomer having 7 to 120 dialkylsiloxane repeating units is included;

about 40-about 60 wt % of at least one slow reacting hydrophilic monomer;

at least one hydroxyl containing hydrophilic monomer, wherein the molar ratio of hydroxyl containing components to the slow reacting hydrophilic monomer is between about 0.15 to about 0.4, wherein the reactive mixture is free of diluent.

The silicone hydrogels of the present invention are useful for making biomedical devices, ophthalmic devices, and particularly contact lenses.

DETAILED DESCRIPTION OF THE INVENTION

Figure 1:
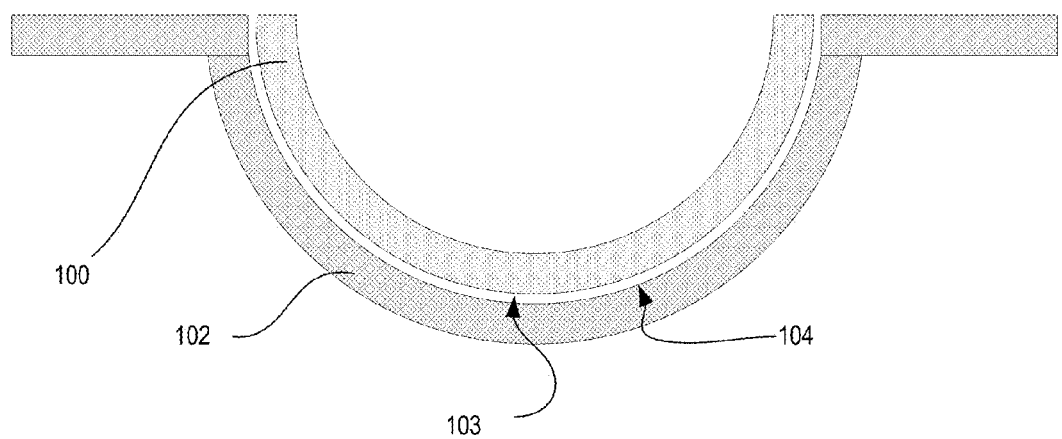
FIG. 1 is a schematic of a lens assembly.

The present invention relates to silicone hydrogels having a desirable balance of properties which can be formed without diluents. The silicone hydrogels are formed from reactive mixtures comprising at least one hydroxyl substituted, monofunctional polydialkylsiloxane monomer having between 2 and 120 dialkylsiloxane repeating units, at least one slow reacting hydrophilic monomer and at least one hydroxyl containing hydrophilic monomer. The resulting silicone hydrogels are surprisingly easy to process and display an exceptional balance of properties including haze, water content and oxygen permeability.

As used herein, "diluent" refers to a non-reactive solvent for the reactive components. Diluents do not react to form part of the biomedical devices.

As used herein, a "biomedical device" is any article that is designed to be used while either in or on mammalian tissues or fluid, or in or on human tissue or fluids. Examples of these devices include but are not limited to catheters, implants, stents, and ophthalmic devices such as intraocular lenses, punctal plugs and contact lenses. In one embodiment, the biomedical devices are ophthalmic devices, particularly contact lenses, most particularly contact lenses made from silicone hydrogels.

As used herein, the terms "ophthalmic device" refers to products that reside in or on the eye. As used herein, the terms "lens" and "ophthalmic device" refer to devices that reside in or on the eye. These devices can provide optical correction, wound care, drug delivery, diagnostic functionality, cosmetic enhancement or effect, glare reduction, UV blocking or a combination of these properties. Non-limiting examples of ophthalmic devices include lenses, punctal plugs and the like. The term lens (or contact lens) includes but is not limited to soft contact lenses, hard contact lenses, intraocular lenses, overlay lenses, ocular inserts, and optical inserts.

As used herein "reaction mixture" refers to reactive and non-reactive components that are mixed together and reacted to form the silicone hydrogels of the present invention. The reactive components are everything in the reaction mixture except the diluent and any additional processing aids which do not become part of the structure of the polymer.

As used herein "(meth)" refers to an optional methyl substitution. Thus, a term such as "(meth)acrylate" denotes both methacrylic and acrylic radicals.

All percentages in this specification are weight percentages unless otherwise noted.

As used herein, the phrase "without a surface treatment" or "not surface treated" means that the exterior surfaces of the devices of the present invention are not separately treated to improve the wettability of the device. Treatments which may be foregone because of the present invention include, plasma treatments, grafting, coating and the like. Coatings which provide properties other than improved wettability, such as, but not limited to antimicrobial coatings and the application of color or other cosmetic enhancement, are not considered surface treatment.

As used herein "silicone macromers" and silicone "prepolymers" mean mono- and multi-functional silicone containing compounds having molecular weights of greater than about 2000.

As used herein "hydroxyl-containing component" is any component containing at least one hydroxyl group.

As used herein "kinetic half life" means the time elapsed at the given reaction conditions for 50% of the reactive component to be consumed. Kinetic half life may be calculated using the method and calculations described herein.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl (meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. Non-limiting examples of the free radical reactive groups include (meth)acrylate, acryloxy, (meth)acrylamide, and mixtures thereof.

As used herein "hydrophilic" means water soluble. Hydrophilic components are those which are soluble in water at 25° C. and a concentration of 1 weight part hydrophilic component to 9 weight parts water.

As used herein, "clear" means a haze value less than about 50%.

In the present invention the components are selected to react at specific points in the reaction. For example, "fast reacting" components are selected to polymerize primarily at the beginning of the overall copolymerization reaction, while the slow reacting hydrophilic monomer is selected to polymerize primarily at the end of the overall copolymerization reaction. Fast reacting components include the silicone-containing components, the hydroxyalkyl monomers and some crosslinkers. In one embodiment slow reacting components have kinetic half lives which are at least about two times greater than the fastest silicone containing monomer. Kinetic half lives may be measured as described herein. It should be appreciated that the kinetic half lives are relative to specific formulations.

Examples of slow reacting groups include (meth)acrylamides, vinyls, allyls and combinations thereof and a least one hydrophilic group. In another embodiment the slow reacting group is selected from N-vinyl amides, O-vinyl carbamates, O-vinyl carbonates, N-vinyl carbamates, O-vinyl ethers, O-2-propenyl, wherein the vinyl or allyl groups may be further substituted with a methyl group. In yet another embodiment the slow reacting group is selected from N-vinyl amides, O-vinyl carbonates, and O-vinyl carbamates.

Examples of fast reacting groups include (meth)acrylates, styryls, (meth)acryamides and mixtures thereof. Generally (meth)acrylates are faster than (meth)acrylamides, and acrylamides are faster than (meth)acrylamides.

Throughout the specification, wherever chemical structures are given, it should be appreciated that alternatives disclosed for the substituents on the structure may be combined in any combination. Thus if a structure contained substituents $R_1$ and $R_2$, each of which contained three lists of potential groups, 9 combinations are disclosed. The same applies for combinations of properties.

It has been surprisingly found that by selecting the components of the reaction mixture, silicone hydrogels having a desirable balance of properties may be formed without the use of a diluent.

Silicone hydrogels are formed by reacting a number of different polymerizable components to for a polymer. Silicone hydrogel reactive mixtures generally contain both hydrophilic components, which allow the polymer to absorb substantially quantities of water, and silicone components, which allow the polymer to transmit oxygen. Unfortunately silicone is highly hydrophobic, and the more silicone a component has, the less compatible it will be with hydrophilic components. Also, it is desirable for some end uses, like contact lenses, for the resulting silicone hydrogels to have a combination of both high water content (50% or more) and good oxygen permeability (greater than 60, or greater than 80 barrers). However, because those properties come from different components, which can be incompatible, achieving this balance has been difficult, and increasing one property (for example water content) generally results in decreasing another property (usually oxygen permeability). Past attempts have required the use of diluents to compatibilize the components. However, the diluents can be expensive, flammable and difficult to remove from the lenses, making manufacturing more difficult.

It has been surprisingly found that a family of silicone hydrogel polymers having a desirable balance of properties may be made without the use of diluents. Many of these formulations have mechanical properties which allow them to be dry released from the lens molds, further simplifying the lens making process.

The silicone hydrogels of the present invention display a combination of water contents of at least about 50% and Dk values of at least about 60, or at least about 80. The silicone hydrogels are also clear.

The reaction mixtures of the present invention are diluent free, comprise about 40 and about 60 wt % of at least one slow-reacting hydrophilic monomer; at least one monofunctional, hydroxyl-containing siloxane monomer; and at least one hydroxyl containing hydrophilic monomer, wherein the molar ratio of hydroxyl containing components to the slow reacting hydrophilic monomer is between about 0.15 to about 0.4.

The first component of the reactive mixture is at least one slow-reacting hydrophilic monomer. Slow-reacting hydrophilic monomers comprises at least one slow reacting group and a least one hydrophilic group. The slow reacting group may be selected from N-vinyl amides, O-vinyl carbamates, O-vinyl carbonates, N-vinyl carbamates, O-vinyl ethers, O-2-propenyl, wherein the vinyl or allyl groups may be further substituted with a methyl group. The slow reacting group may be selected from N-vinyl amides, O-vinyl carbonates, and O-vinyl carbamates. Hydrophilic groups include hydroxyls, amines, ethers, amides, ammonium groups, carboxylic acid, carbamates, combinations thereof and the like. Suitable hydrophilic groups include hydroxyls, ethers, amides, carboxylic acid combinations thereof and the like. If a (meth)acrylamide is selected as the slow-reacting hydrophilic monomer, a silicone-containing monomer having a very short kinetic half life, such as an acrylate must be used.

The slow-reacting hydrophilic monomer may be selected from N-vinylamide monomer of Formula I, a vinyl pyrrolidone of Formula II-IV, and n-vinyl piperidone of Formula V:

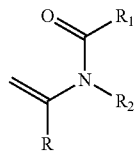

Formula I

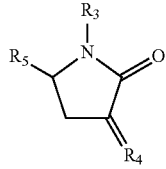

Formula II

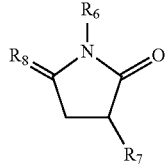

Formula III

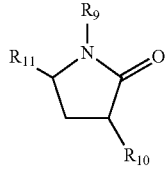

Formula IV

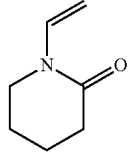

Formula V wherein R is H or methyl, and in one embodiment R is H;
$R_1$, $R_2$, $R_3$, $R_6$, $R_7$, $R_{10}$, and $R_{11}$ are independently selected from H, $CH_3$, $CH_2CH_3$, $CH_2CH_2CH_3$, $C(CH_3)_2$;
$R_4$ and $R_8$ are independently selected from $CH_2$, $CHCH_3$ and $—C(CH_3)$;
$R_5$ is selected from H, methyl, ethyl; and
$R_9$ is selected from $CH=CH_2$, $CCH_3=CH_2$, and $CH=CHCH_3$.

The total number of carbon atoms in $R_1$ and $R_2$ may be 4 or less, preferably $R_1$ and $R_2$ are methyl.

The slow-reacting hydrophilic monomer may be selected from the N-vinyl amide monomer of Formula I or a vinyl pyrrolidone of Formula II or IV. In yet another embodiment $R_6$ is methyl, $R_7$ is hydrogen, $R_9$ is $CH=CH_2$, $R_{10}$ and $R_{11}$ are H.

In another embodiment the slow-reacting hydrophilic monomer is selected from ethylene glycol vinyl ether (EGVE), di(ethylene glycol) vinyl ether (DEGVE), N-vinyl lactams, including N-vinyl pyrrolidone (NVP), 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, N-vinyl-N-methyl acetamide (VMA), N-vinyl-N-ethyl acetamide, N-vinyl-N-ethyl formamide, N-vinyl formamide, N-vinyl acetamide, N-vinyl isopropylamide, allyl alcohol, N-vinyl caprolactam, N-2-hydroxyethyl vinyl carbamate, N-carboxyvinyl-β-alanine (VINAL), N-carboxyvinyl-α-alanine and mixtures thereof.

In another embodiment the slow-reacting hydrophilic monomer is selected from N-vinylpyrrolidone, N-vinylacetamide, 1-methyl-3-methylene-2-pyrrolidone, 1-methyl-5-methylene-2-pyrrolidone, 5-methyl-3-methylene-2-pyrrolidone, and mixtures thereof. In yet another embodiment the slow-reacting hydrophilic monomer is selected from NVP, VMA and 1-methyl-5-methylene-2-pyrrolidone. In yet another embodiment the slow-reacting hydrophilic monomer comprises NVP.

The diluent-free formulations of the present invention further comprise at least one fast-reacting, monofunctional, hydroxyl-containing siloxane component which comprises at least 2 alkyl siloxane groups. In some embodiments the at least one monofunctional, hydroxyl-containing siloxane component comprises a polydialkyl siloxane having between about 4 and about 120, between about 4 and about 60 and between about 4 and in other embodiments about 30 repeating units. The alkyl siloxane groups can be dialkyl siloxane groups, trialkyl siloxane groups or a combination thereof, however, highly branched siloxane groups, such as tris(trimethyl siloxane) groups are not preferred as they provide undesirable mechanical properties to the resulting polymers. Thus, in one embodiment, the silicone hydrogels are formed from reactive mixtures which comprise less than about 10%, less than 5% and 0% TRIS.

When a single siloxane-containing component is desired, the at least one fast reacting, monofunctional, hydroxyl-containing siloxane component will comprise a sufficient number of alkyl siloxane groups to provide the resulting silicone hydrogel with between about 8 and about 17 wt % silicon, based upon the weight of the copolymer, not including water. Suitable at least one fast-reacting, monofunctional, hydroxyl-containing siloxane component for this embodiment will comprise between about 4 and about 120, between about 6 and about 60 and in other embodiments between about 6 and about 30 dialkyl siloxane repeating units.

In another embodiment the reaction mixtures of the present invention comprise at least one monofunctional, hydroxyl-containing siloxane component which comprises at least 2 alkyl siloxane groups and at least one monofunctional, siloxane monomer having 7 to 120 dialkylsiloxane repeating units, between about 4 and about 60 and between about 4 and in other embodiments about 30 repeating units.

The at least one monofunctional, siloxane monomer comprises (a) a fast reacting group and (b) a polydialkyl siloxane chain. In another embodiment the at least one monofunctional, siloxane monomer comprises a reactive group selected from (meth)acrylates, styryls, (meth)acrylamides and mixtures thereof. The monofunctional, siloxane monomer may also contain at least one fluorine. In yet another embodiment the monofunctional, siloxane monomer is selected from mono(meth)acryloxyalkyl polydialkylsiloxane monomer of Formula VII or the styryl polydialkylsiloxane monomer of Formula VIII:

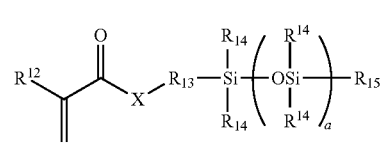
Formula VII

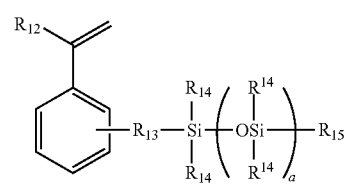
Formula VIII wherein $R_{12}$ is H or methyl;

X is O or $NR_{16}$,

Each $R_{14}$ is independently a $C_1$ to $C_4$ alkyl which may be fluorine substituted, or phenyl, and in another embodiment each $R_{14}$ is independently selected from ethyl and methyl groups, and in yet another embodiment, all $R_{14}$ are methyl or at least one $R_{14}$ may be 3,3,3-trifluoropropyl. $R_{12}$ and each $R_{14}$ may be methyl.

$R_{15}$ is a $C_1$ to $C_4$ alkyl;

$R_{13}$ is a divalent alkyl group, which may further be functionalized with a group selected from the group consisting of ether groups, hydroxyl groups, carbamate groups and combinations thereof, and in another embodiment $C_1$-$C_6$ alkylene groups which may be substituted with ether, hydroxyl and combinations thereof, and in yet another embodiment $C_1$ or $C_3$-$C_6$ alkylene groups which may be substituted with ether, hydroxyl and combinations thereof; a is 7 to 120, 7-60 and in some embodiments 7 to 30.

$R_{16}$ is selected from H, $C_{1-4}$ alkyl, which may be further substituted with one or more hydroxyl groups, and in some embodiments is H or methyl.

In yet another embodiment $R_{12}$ and each $R_{14}$ are methyl.

In yet another embodiment at least one $R_{14}$ is 3,3,3-trifluoropropyl.

In one embodiment the at least one monofunctional, siloxane monomer is selected from mono(meth)acryloxyalkyl polydialkylsiloxane monomer of Formula VII. Examples of suitable silicone-containing monomers include monomethacryloxyalkylpolydimethylsiloxane methacrylates selected from the group consisting of monomethacryloxypropyl terminated mono-n-butyl terminated polydimethylsiloxane, monomethacryloxypropyl terminated mono-n-methyl terminated polydimethylsiloxane, monomethacryloxypropyl terminated mono-n-butyl terminated polydiethylsiloxane, monomethacryloxypropyl terminated mono-n-methyl terminated polydimethylsiloxane, N-(2,3-dihydroxypropane)-N'-(propyl tetra(dimethylsiloxy)dimethylbutylsilane)acrylamide, α-(2-hydroxy-1-methacryloxypropyloxypropyl)-ω-butyl-decamethylpentasiloxane, and mixtures thereof.

In another embodiment the silicone-containing component is selected from the group consisting of monomethacryloxypropyl terminated mono-n-butyl terminated polydimethylsiloxane, monomethacryloxypropyl terminated mono-n-methyl terminated polydimethylsiloxane, N-(2,3-dihydroxypropane)-N'-(propyl tetra(dimethylsiloxy)dimethylbutylsilane)acrylamide, α-(2-hydroxy-1-methacryloxypropyloxypropyl)-ω-butyl-decamethylpentasiloxane, and mixtures thereof.

In another embodiment the silicone containing component is selected from acrylamide silicones of US20110237766, and particularly the silicone monomers expressed in the following general formulae (s1) through (s6).

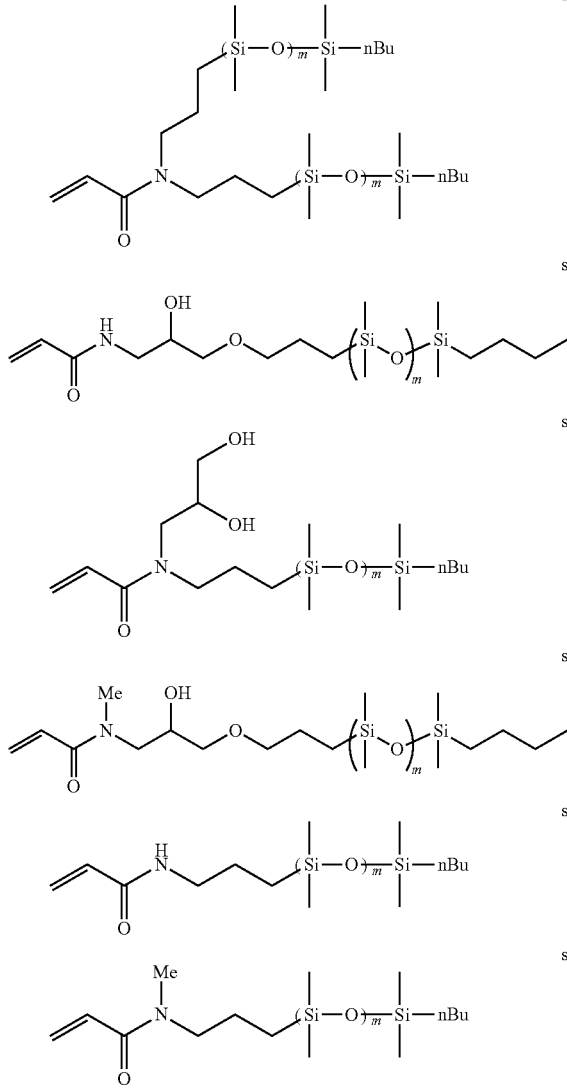

wherein m is 4-12 and in some embodiments 4-10.

Additional silicone containing components may also be included. Any additional disclosed silicone components having the herein disclosed reactive groups may be included. Examples include silicone containing monomers displaying branched siloxane chains such as SiMAA and TRIS.

The at least one mono-functional silicone-containing monomer is present in the reactive mixture in an amount sufficient to provide the desired oxygen permeability. It is a benefit of the present invention that oxygen permeabilities greater than about 80 barrer, in some embodiments greater than about 90 barrer, and in other embodiments greater than about 100 barrer may be achieved. Suitable amounts will depend on the length of the siloxane chain included in the silicone-containing monomers, with silicone-containing monomers having longer chains requiring less monomer. Amounts include from about 20 to about 60 weight %, and in some embodiments from about 30 to about 55 weight %.

When the mono-functional silicone-containing monomer does not contain at least one hydroxyl group, the reaction mixtures of the present invention further comprise at least one monofunctional, hydroxyl-containing siloxane component which comprises at least 2 alkyl siloxane groups. The monofunctional, hydroxyl-containing siloxane component contains the same reactive functionality as the mono-functional silicone-containing monomer. In some embodiments the monofunctional, hydroxyl-containing siloxane component is a compound of Formula IX

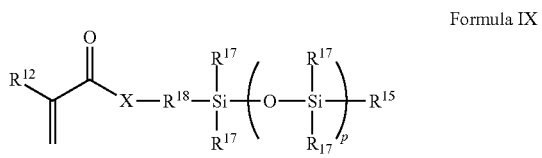

Formula IX where $R_{12}$, $R_3$, $R_{15}$, X are as defined above, p is 4-20, and in some embodiments 4-12

$R_{18}$ is a divalent alkyl group substituted with at least one hydroxyl group, which may further be functionalized with a group selected from the group consisting of ether groups, carbamate groups and combinations thereof, and in another embodiment $C_1$-$C_6$ alkylene groups substituted with at least one hydroxyl group which may also be substituted with at least one ether group, and in yet another embodiment $C_1$ or $C_3$-$C_6$ alkylene groups substituted with at least one hydroxyl group which may also be substituted with at least one ether group;

$R_{17}$ is selected from $R_{14}$ or trimethylsiloxy groups.

Examples of monofunctional, hydroxyl-containing siloxane components include 3-(methacryloxy-2-hydroxypropoxy)propylbis(trimethylsiloxy)methyl silane, (SimMA), α-(2-hydroxy-1-methacryloxypropyloxypropyl)-w-butyl-octamethylpentasiloxane, N-(2,3-dihydroxypropane)-N'-(propyl tetra(dimethylsiloxy)dimethylbutylsilane) acrylamide:

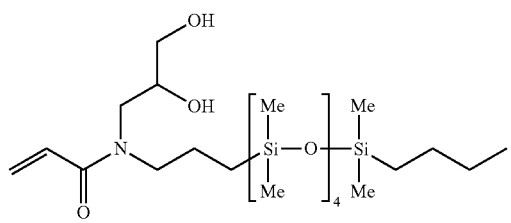

and monomers of the following structures:

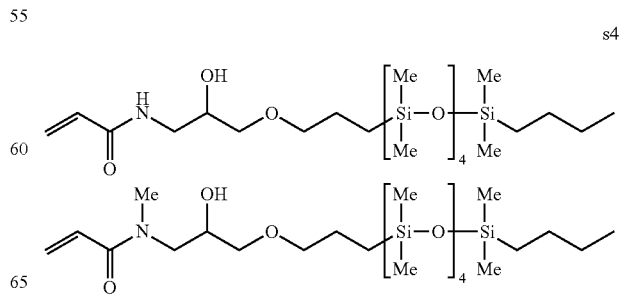

In another embodiment the monofunctional, hydroxyl-containing siloxane component comprises α-(2-hydroxy-1-methacryloxypropyloxypropyl)-ω-butyl-octamethylpentasiloxane.

In one embodiment the reaction mixture is substantially free of TRIS, and in another is substantially free of silicone containing macromers or prepolymers having a number average molecular weight greater than about 8,000 and in another embodiment greater than about 5,000.

The reaction mixtures of the present invention further comprise at least one hydroxyalkyl monomer selected from hydroxyalkyl(meth)acrylate or (meth)acrylamide monomer of Formula X or a styryl compound of Formula XI

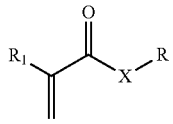

FORMULA X

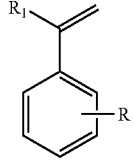

FORMULA XI wherein $R_1$ is H or methyl,

X is O or $NR_4$, $R_4$ is a H, $C_1$ to $C_4$ alkyl, which may be further substituted with at least one OH, in some embodiments methyl or 2-hydroxyethyl; and R is selected from $C_2$-$C_4$ mono or dihydroxy substituted alkyl, and poly(ethylene glycol) having 1-10 repeating units; and in some embodiments 2-hydroxyethyl, 2,3-dihydroxypropyl, or 2-hydroxypropyl.

In one embodiment $R_1$ is H or methyl, X is oxygen and R is selected from $C_2$-$C_4$ mono or dihydroxy substituted alkyl, and poly(ethylene glycol) having 1-10 repeating units. In another embodiment $R_1$ methyl, X is oxygen and R is selected from $C_2$-$C_4$ mono or dihydroxy substituted alkyl, and poly(ethylene glycol) having 2-20 repeating units, and in yet another embodiment $R_1$ methyl, X is oxygen and R is selected from $C_2$-$C_4$ mono or dihydroxy substituted alkyl. In one embodiment, at least one hydroxy group is on the terminal end of the R alkyl group.

Examples of suitable hydroxyalkyl monomers include 2-hydroxyethyl methacrylate, 2-hydroxyethyl acrylate, 3-hydroxypropyl(meth)acrylate, 2-hydroxypropyl(meth)acrylate, 1-hydroxypropyl-2-(meth)acrylate, 2-hydroxy-2-methyl-propyl(meth)acrylate, 3-hydroxy-2,2-dimethyl-propyl(meth)acrylate, 4-hydroxybutyl(meth)acrylate, glycerol (meth)acrylate, 2-hydroxyethyl(meth)acrylamide, polyethyleneglycol monomethacrylate, bis-(2-hydroxyethyl)(meth)acrylamide, 2,3-dihydroxypropyl(meth)acrylamide, and mixtures thereof.

In another embodiment the hydroxyalkyl monomer is selected from the group consisting of 2-hydroxyethyl methacrylate, glycerol methacrylate, 2-hydroxypropyl methacrylate, hydroxybutyl methacrylate, 3-hydroxy-2,2-dimethyl-propyl methacrylate, and mixtures thereof.

In yet another embodiment the hydroxyalkyl monomer comprises 2-hydroxyethyl methacrylate, and in another embodiment comprises 3-hydroxy-2,2-dimethyl-propyl methacrylate. In an alternate embodiment the reactive hydroxyalkyl monomer comprises glycerol methacrylate.

In one embodiment, the hydroxyl containing components have the same reactive functionality as the silicone-containing monomers.

The hydroxyalkyl monomers are present in mole percents which form a molar ratio of hydroxyl groups to slow reacting hydrophilic monomer of at least about 0.15 and in some embodiments between about 0.15 and about 0.4. This is calculated by dividing the number of moles of hydroxyl groups in the hydroxyalkyl monomers (including any hydroxyl groups on the slow-reacting hydrophilic monomer and the silicone-containing monomer) by the number of moles of the slow-reacting hydrophilic monomer per a given mass of the monomer mix. In this embodiment, for a reaction mixture comprising HO-mPDMS, HEMA, EGVE and NVP, the hydroxyl groups on each of HO-mPDMS, HEMA and EGVE would be counted. Any hydroxyl groups present in the diluent (if used) are not included in the calculation. In one embodiment, the lower amount of hydroxyalkyl monomers is selected to provide a haze value to the final lens of less than about 50% and in some embodiments less than about 30%.

Alternatively, the molar ratio of all hydroxyl groups on reaction components in the reaction mixture to silicon (HO:Si) is between about 0.16 and about 0.4. The molar ratio is calculated by dividing molar concentration of hydroxyl groups in the components of the reactive mixture (other than any hydroxyls which are part of the slow-reacting hydrophilic monomer or diluents) by the molar concentration of silicon. In this embodiment both the hydroxyalkyl monomers and any hydroxyl-containing silicone components are included in the calculation. Thus, in calculating the HO:Si ratio of the reaction mixture comprising HO-mPDMS, HEMA, NVP and EGVE, only the hydroxyl groups on each of HO-mPDMS, HEMA would be counted in calculating the HO:Si.

It will be appreciated that the minimum amount of hydroxyl component will vary depending upon a number of factors, including, the number of hydroxyl groups on the hydroxyalkyl monomer, the amount, molecular weight and presence or absence of hydrophilic functionality on the silicone containing components. For example, where HEMA is used as the hydroxyalkyl monomer and mPDMS is used in amounts about 38 wt % as the sole silicone containing monomer, at least about 8 wt % HEMA (0.16 HO:Si) is included to provide the desired haze values. However, when lesser amounts of mPDMS are used (about 20%), as little as about 2 or 3% HEMA provides silicone hydrogel contact lenses having haze values below about 50%. Similarly, when the formulation includes substantial amounts of a hydroxyl-containing silicone component (such as greater than about 20 wt % HO-mPDMS as in Examples 68-73), amounts of HEMA as low as about 7 wt % (0.13 HO:Si, or 0.24 $HO_{total}$:Si) may provide the desired level of haze.

Where Dk values greater than about 60, 80 or 100 barrers are desired, an excess of hydroxyalkyl monomer beyond what is necessary to achieve the desired haze is not desirable.

The reactive mixture may further comprise additional hydrophilic monomers. Any hydrophilic monomers used to prepare hydrogels may be used. For example monomers containing acrylic groups ($CH_2$=CROX, where R is hydrogen or $C_{1-6}$alkyl an X is O or N) or vinyl groups (—C=$CH_2$) may be used. Examples of additional hydrophilic monomers are N,N-dimethylacrylamide, polyethyleneglycol monomethacrylate, methacrylic acid, acrylic acid, combinations thereof and the like.

The reaction mixtures of the present invention may additionally comprise at least one crosslinker.

Suitable crosslinkers include monomers with two or more polymerizable double bonds, such as ethylene glycol dimethacrylate ("EGDMA"), trimethylolpropane trimethacrylate ("TMPTMA"), glycerol trimethacrylate, polyethylene glycol dimethacrylate (wherein the polyethylene glycol preferably has a molecular weight up to, e.g., about 5000), and other polyacrylate and polymethacrylate esters, such as the end-capped polyoxyethylene polyols described above containing two or more terminal methacrylate moieties. The amount of crosslinker is balanced with the amount and types of silicone components selected to achieve the desired modulus. Suitable amounts include molar concentrations between about 0.6 to about 2.4 mmole/100 g of reactive components in the reaction mixture and in some embodiments between about 0.6 to about 1.8 mmole/100 g reactive components. Alternatively, if the hydrophilic monomers and/or the silicone containing monomers act as the cross-linking agent, the addition of a crosslinking agent to the reaction mixture is optional. Examples of hydrophilic monomers which can act as the crosslinking agent and when present do not require the addition of an additional crosslinking agent to the reaction mixture include polyoxyethylene polyols described above containing two or more terminal methacrylate moieties.

An example of a silicone containing monomer which can act as a crosslinking agent and, when present, does not require the addition of an additional crosslinking monomer to the reaction mixture includes α,ω-bismethacryloypropyl polydimethylsiloxane.

The reaction mixtures can also contain multiple crosslinkers depending on the reaction rate of the hydrophilic component. With very slow reacting hydrophilic components (e.g. VMA, EGVE, DEGVE) crosslinkers having slow reacting functional groups (e.g. di-vinyl, tri-vinyl, di-allyl, tri-allyl) or a combination of slow reacting functional groups and fast reacting functional groups (e.g. HEMAVc) can be combined with crosslinkers having fast reacting functional groups ((meth)acrylates) to improve the retention of the polymers of the slow-reacting monomers in the final hydrogel.

In one embodiment the reaction mixture comprises at least two crosslinkers, at least one first crosslinker having functional groups which will react with the silicone components and hydroxyl alkyl(meth)acrylates and at least one second crosslinker having functional groups which react with the slow reacting hydrophilic monomer. This mixture of fast and slow reacting crosslinkers provides the final polymer with improved resilience and recovery, particularly on the surface of the lens. Examples of suitable first crosslinkers include those having only (meth)acrylate functionality, such as EGDMA, TEGDMA and combinations thereof. Examples of suitable second crosslinkers include those having only vinyl functionality, such as triallyl cyanurate (TAC). When mixtures are used, suitable amounts of all crosslinker in the reactive mixture include between about 0.10% and about 1%, and about 0.1 to about 0.5% wt, excluding diluent respectively. In another embodiment the total amount of all crosslinker in the reactive mixtures is between 0.7 to about 6.0 mmol/100 g of polymerizable components; between about 0.7 to about 4.0 mmoles per 100 g of reactive components. The fast and slow reacting crosslinkers are present in respective amounts of about 0.30 to about 2.0 mmol/100 g of polymerizable components; and between about 0.4 to about 2.0 mmoles per 100 g of reactive components.

The reaction mixture may also comprise at least one UV absorbing compound. Suitable UV absorbers may be derived from 2-(2'-hydroxyphenyl)benzotriazoles, 2-hydroxybenzophenones, 2-hydroxyphenyltriazines, oxanilides, cyanoacrylates, salicylates and 4-hydroxybenzoates; which may be further reacted to incorporate reactive polymerizable groups, such as (meth)acrylates. Specific examples of UV absorbers which include polymerizable groups include 2-(2'-hydroxy-5-methacrylyloxyethylphenyl)-2H-benzotriazole (Norbloc), 5-vinyl and 5-isopropenyl derivatives of 2-(2,4-dihydroxyphenyl)-2H-benzotriazole and 4-acrylates or 4-methacrylates of 2-(2,4-dihydroxyphenyl)-2H-benzotriazole or 2-(2,4-dihydroxyphenyl)-1,3-2H-dibenzotriazole, mixtures thereof and the like. When a UV absorber is included, it may be included in amounts between about 0.5 and about 4 wt. %, and in other embodiments between about 1 wt % and about 2 wt %.

A polymerization initiator is preferably included in the reaction mixture. The polymerization initiators includes compounds such as lauroyl peroxide, benzoyl peroxide, isopropyl percarbonate, azobisisobutyronitrile, and the like, that generate free radicals at moderately elevated temperatures, photoinitiator systems such as an aromatic alpha-hydroxy ketone and a tertiary amine plus a diketone. Illustrative examples of photoinitiator systems are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), and a combination of camphorquinone and ethyl 4-(N,N-dimethylamino)benzoate.

In one embodiment, the reaction mixtures of the present invention comprise at least one photoinitiator. The use of photoinitiation provides desirable cure times (time to reach essentially complete cure) of less than about 30 minutes, less than about 20 minutes and in some embodiments less than about 15 minutes. Suitable photoinitiator systems include aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N, N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998, which is incorporated herein by reference. The initiator is used in the reaction mixture in effective amounts to initiate photopolymerization of the reaction mixture, e.g., from about 0.1 to about 2 parts by weight per 100 parts of reactive monomer.

In some embodiments inhibitors may also be included. Free radical inhibitors are compounds that react rapidly with propagating radicals to produce stable radical species that terminate the chain. Classes of inhibitors include quinones, substituted phenols, secondary aromatic amines, lactones and nitro compounds. Specific examples of inhibitors include BHT, MEHQ, hydroxyamines, benzofuranone derivatives, molecular oxygen, vitamin E, nitric oxide/nitrogen dioxide mixtures (which form nitroxides in situ) mixtures and combinations thereof and the like.

Some inhibitors may be included with the monomers which are selected. Inhibitors may also be intentionally added to the reaction mixtures of the present application. The amount of inhibitor which may be included is from about 100 to about 2,500 µgm/gm of reaction mixture.

Polymerization of the reaction mixture can be initiated using the appropriate choice visible or ultraviolet light. Alternatively, initiation can be conducted without a photoinitiator using, for example, e-beam. In another embodiment the initiators are selected from bisacylphosphine oxides, such as bis(2,4,6-trimethylbenzoyl)-phenyl phosphine oxide (Irgacure 819®) or a combination of 1-hydroxycyclohexyl phenyl ketone and bis(2,6-dimethoxybenzoyl)-2,4-4-trimethylpentyl phosphine oxide (DMBAPO). In one embodiment a preferred method of polymerization initiation is visible light. In another bis(2,4,6-trimethylbenzoyl)-phenyl phosphine oxide (Irgacure 819®) is the photo initiator.

The reaction mixtures of the present invention are formed without diluent, or "neat".

The reactive mixture may contain additional components such as, but not limited to, medicinal agents, antimicrobial compounds, reactive tints, pigments, copolymerizable and non-polymerizable dyes, release agents and combinations thereof.

Combinations of reactive components include those having from about 30 to about 50 weight % silicone containing monomers (including both monofunctional silicone-containing monomers and monofunctional hydroxyl-containing siloxane components), about 40 to about 60 weight % at least one slow-reacting monomer, from about 1 to about 15 weight % of an hydroxyalkyl monomer (all based upon the weight % of all reactive components).

The reaction mixtures of the present invention can be formed by any of the methods known to those skilled in the art, such as shaking or stirring, and used to form polymeric articles or devices by known methods.

For example, the biomedical devices of the invention may be prepared by mixing reactive components with a polymerization initiator and curing by appropriate conditions to form a product that can be subsequently formed into the appropriate shape by lathing, cutting and the like. Alternatively, the reaction mixture may be placed in a mold and subsequently cured into the appropriate article.

Various processes are known for processing the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. In one embodiment, the method for producing contact lenses comprising the polymer of this invention is by the direct molding of the silicone hydrogels, which is economical, and enables precise control over the final shape of the hydrated lens. For this method, the reaction mixture is placed in a mold having the shape of the final desired silicone hydrogel, i.e., water-swollen polymer, and the reaction mixture is subjected to conditions whereby the monomers polymerize, to thereby produce a polymer in the shape of the final desired product.

Referring to FIG. 1, a diagram is illustrated of an ophthalmic lens 100, such as a contact lens, and mold parts 101-102 used to form the ophthalmic lens 100. In some embodiments, the mold parts include a back surface mold part 101 and a front surface mold part 102. As used herein, the term "front surface mold part" refers to the mold part whose concave surface 104 is a lens forming surface used to form the front surface of the ophthalmic lens. Similarly, the term "back surface mold part" refers to the mold part 101 whose convex surface 105 forms a lens forming surface, which will form the back surface of the ophthalmic lens 100. In some embodiments, mold parts 101 and 102 are of a concavo-convex shape, preferably including planar annular flanges, which surround the circumference of the uppermost edges of the concavo-convex regions of the mold parts 101-102.

Typically, the mold parts 101-102 are arrayed as a "sandwich". The front surface mold part 102 is on the bottom, with the concave surface 104 of the mold part facing upwards. The back surface mold part 101 can be disposed symmetrically on top of the front surface mold part 102, with the convex surface 105 of the back surface mold part 101 projecting partially into the concave region of the front surface mold part 102. In one embodiment, the back surface mold part 101 is dimensioned such that the convex surface 105 thereof engages the outer edge of the concave surface 104 of the front mold part 102 throughout its circumference, thereby cooperating to form a sealed mold cavity in which the ophthalmic lens 100 is formed.

In some embodiments, the mold parts 101-102 are fashioned of thermoplastic and are transparent to polymerization-initiating actinic radiation, by which is meant that at least some, and in some embodiments all, radiation of an intensity and wavelength effective to initiate polymerization of the reaction mixture in the mold cavity can pass through the mold parts 101-102.

For example, thermoplastics suitable for making the mold parts can include: polystyrene; polyvinylchloride; polyolefin, such as polyethylene and polypropylene; copolymers or mixtures of styrene with acrylonitrile or butadiene, polyacrylonitrile, polyamides, polyesters, cyclic olefin copolymers such as Topas available from Ticona or Zeonor available from Zeon, combinations, such as blends or copolymers of any of the foregoing, or other known materials.

Following polymerization of the reaction mixture to form a lens 100, the lens surface 103 will typically adhere to the mold part surface 104. The steps of the present invention facilitate release of the surface 103 from the mold part surface. The first mold part 101 can be separated from the second mold part 102 in a demolding process. In some embodiments, the lens 100 will have adhered to the second mold part 102 (i.e. the front curve mold part) during the cure process and remain with the second mold part 102 after separation until the lens 100 has been released from the front curve mold part 102. In other embodiments, the lens 100 can adhere to the first mold part 101.

The lens 100 may be removed from the mold part may be released from the mold by any process, including contacting with a solvent or dry release. In one embodiment, the lenses may be released from the mold dry, by application of mechanical force.

In another embodiment, the lens 100 and the mold part to which it is adhered after demolding are contacted with an aqueous solution. The aqueous solution can be heated to any temperature below the boiling point of the aqueous solution. Heating can be accomplished with a heat exchange unit to minimize the possibility of explosion, or by any other feasible means or apparatus for heating a liquid.

As used herein, processing includes the steps of removing the lens from the mold and contacting the lens with an aqueous solution. The steps may be done separately, or in a single step or stage. The processing temperature may be any temperatures between about 30° C. and the boiling point of the aqueous solutions, in some embodiments between about 30° C. and about 95° C., and in some embodiments between about 50° C. and about 95° C.

The aqueous solution is primarily water. In some embodiments, the aqueous solution is at least about 70 wt % water, and in other embodiments at least about 90 weight % water and in other embodiments at least about 95%. The aqueous solution may also be a contact lens packaging solution such as borate buffered saline solution, sodium borate solutions, sodium bicarbonate solutions and the like. The aqueous solution may also include additives, such as surfactants, preservatives, release aids, antibacterial agents, pharmaceutical and nutriceutical components, lubricants, wetting agents, salts, buffers, mixtures thereof and the like. Specific examples of additives which may be included in the aqueous solution include Tween 80, which is polyoxyethylene sorbitan monooleate, Tyloxapol, octylphenoxy(oxyethylene) ethanol, amphoteric 10), EDTA, sorbic acid, DYMED, chlorhexadine gluconate, hydrogen peroxide, thimerosal, polyquad, polyhexamethylene biguanide, mixtures thereof and the like. Where various zones are used, different additives may be included in different zones. In some embodiments, additives can be added to the hydration solution in amounts varying between 0.01% and 10% by weight, but cumulatively less than about 10% by weight.

Exposure of the ophthalmic lens 100 to the aqueous solution can be accomplished by any method, such as washing, spraying, soaking, submerging, or any combination of the aforementioned. For example, in some embodiments, the lens 100 can be washed with an aqueous solution comprising deionized water in a hydration tower.

In embodiments using a hydration tower, front curve mold parts 102 containing lenses 100 can be placed in pallets or trays and stacked vertically. The aqueous solution can be introduced at the top of the stack of lenses 100 so that the solution will flow downwardly over the lenses 100. The solution can also be introduced at various positions along the tower. In some embodiments, the trays can be moved upwardly allowing the lenses 100 to be exposed to increasingly fresher solution.

In other embodiments, the ophthalmic lenses 100 are soaked or submerged in the aqueous solution.

The contacting step can last up to about 12 hours, in some embodiments up to about 2 hours and in other embodiments from about 2 minutes to about 2 hours; however, the length of the contacting step depends upon the lens materials, including any additives, the materials that are used for the solutions or solvents, and the temperatures of the solutions. Sufficient treatment times typically shrink the contact lens and release the lens from the mold part. Longer contacting times will provide greater leaching.

The volume of aqueous solution used may be any amount greater than about 1 ml/lens and in some embodiments greater than about 5 ml/lens.

In some methods, after separation or demolding, the lenses on the front curves, which may be part of a frame, are mated with individual concave slotted cups to receive the contact lenses when they release from the front curves. The cups can be part of a tray. Examples can include trays with 32 lenses each, and 20 trays that can be accumulated into a magazine.

According to another embodiment of the present invention the lenses are submerged in the aqueous solution. In one embodiment, magazines can be accumulated and then lowered into tanks containing the aqueous solution. The aqueous solution may also include other additives as described above. The ophthalmic devices, and particularly ophthalmic lenses of the present invention have a balance of properties which makes them particularly useful. Such properties include clarity, optics, water content, oxygen permeability and contact angle. Thus, in one embodiment, the biomedical devices are contact lenses having a water content of greater than about 55%, greater than about 60%.

As used herein clarity means substantially free from visible haze. Clear lenses have a haze value of less than about 70%, more preferably less than about 50% and in some embodiments less than about 10% using one of the haze tests described herein.

Suitable oxygen permeabilities include those greater than about 80 barrer and in some embodiments greater than about 85 barrer, and in other embodiments at least about 100 barrer.

Also, the biomedical devices, and particularly ophthalmic devices and contact lenses have moduli which are less than about 150 psi, and in some embodiments less than about 100 psi.

The biomedical devices, and particularly ophthalmic devices and contact lenses have average contact angles (advancing) which are less than about 80°, less than about 75° and in some embodiments less than about 70°. In some embodiments the articles of the present invention have combinations of the above described oxygen permeability, water content and contact angle. All combinations of the above ranges are deemed to be within the present invention.

Haze Measurement

Haze is measured by placing a hydrated test lens in borate buffered saline in a clear 20×40×10 mm glass cell at ambient temperature above a flat black background, illuminating from below with a fiber optic lamp (Dolan-Jenner PL-900 fiber optic light or Titan Tool Supply Co. fiber optic light with 0.5" diameter light guide set at a power setting of 4-5.4) at an angle 66° normal to the lens cell, and capturing an image of the lens from above, normal to the lens cell with a video camera (DVC 1300C:19130 RGB camera with Navitar TV Zoom 7000 zoom lens) placed 14 mm above the lens platform. The background scatter is subtracted from the scatter of the lens by subtracting an image of a blank cell using EPIX XCAP V 2.2 software. The subtracted scattered light image is quantitatively analyzed, by integrating over the central 10 mm of the lens, and then comparing to a −1.00 diopter CSI Thin Lens®, which is arbitrarily set at a haze value of 100, with no lens set as a haze value of 0. Five lenses are analyzed and the results are averaged to generate a haze value as a percentage of the standard CSI lens. Lenses have haze levels of less than about 150% (of CSI as set forth above) and in some embodiments less than about 100%.

Alternatively, instead of a −1.00 diopter CSI Thin Lenses®, a series of aqueous dispersions of stock latex spheres (commercially available as 0.49 μm Polystyene Latex Spheres—Certified Nanosphere Size Standards from Ted Pella, Inc., Product Number 610-30) can be used as standards. A series of calibration samples were prepared in deionized water. Each solution of varying concentration was placed in a cuvette (2 mm path length) and the solution haze was measured using the above method.

| Solution | Concentration (wt % × $10^{-4}$) | Mean GS |
|---|---|---|
| 1 | 10.0 | 533 |
| 2 | 6.9 | 439 |

-continued

| Solution | Concentration (wt % × 10$^{-4}$) | Mean GS |
|---|---|---|
| 3 | 5.0 | 379 |
| 4 | 4.0 | 229 |
| 5 | 2.0 | 172 |
| 6 | 0.7 | 138 |

Mean GS = mean gray scale

A corrective factor was derived by dividing the slope of the plot of Mean GS against the concentration (47.1) by the slope of an experimentally obtained standard curve, and multiplying this ratio times measured scatter values for lenses to obtain GS values.

"CSI haze value" may be calculated as follows:

$$\text{CSI haze value} = 100 \times (GS-BS)/(217-BS)$$

Where GS is gray scale and BS is background scatter.

Water Content

The water content of contact lenses was measured as follows: Three sets of three lenses are allowed to sit in packing solution for 24 hours. Each lens is blotted with damp wipes and weighed. The lenses are dried at 60° C. for four hours at a pressure of 0.4 inches Hg or less. The dried lenses are weighed. The water content is calculated as follows:

$$\% \text{ water content} = \frac{(\text{wet weight} - \text{dry weight})}{\text{wet weight}} \times 100$$

The average and standard deviation of the water content are calculated for the samples and are reported.

Modulus

Modulus is measured by using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Percent elongation is $=[(Lf-Lo)/Lo] \times 100$. Tensile modulus is measured at the initial linear portion of the stress/strain curve.

Advancing Contact Angle

All contact angles reported herein are advancing contact angles. The advancing contact angle was measured as follows. Four samples from each set were prepared by cutting out a center strip from the lens approximately 5 mm in width and equilibrated in packing solution. The wetting force between the lens surface and borate buffered saline is measured at 23° C. using a Wilhelmy microbalance while the sample is being immersed into or pulled out of the saline. The following equation is used $$F = 2\gamma p \cos\theta \text{ or } \theta = \cos^{-1}(F/2\gamma p)$$

where F is the wetting force, $\gamma$ is the surface tension of the probe liquid, p is the perimeter of the sample at the meniscus and $\theta$ is the contact angle. The advancing contact angle is obtained from the portion of the wetting experiment where the sample is being immersed into the packing solution. Each sample was cycled four times and the results were averaged to obtain the advancing contact angles for the lens.

Oxygen Permeability (Dk)

The Dk is measured as follows. Lenses are positioned on a polarographic oxygen sensor consisting of a 4 mm diameter gold cathode and a silver ring anode then covered on the upper side with a mesh support. The lens is exposed to an atmosphere of humidified 2.1% $O_2$. The oxygen that diffuses through the lens is measured by the sensor. Lenses are either stacked on top of each other to increase the thickness or a thicker lens is used. The L/Dk of 4 samples with significantly different thickness values are measured and plotted against the thickness. The inverse of the regressed slope is the Dk of the sample. The reference values are those measured on commercially available contact lenses using this method. Balafilcon A lenses available from Bausch & Lomb give a measurement of approx. 79 barrer. Etafilcon lenses give a measurement of 20 to 25 barrer. (1 barrer= $10^{-10}$ ($cm^3$ of gas$\times cm^2$)/($cm^3$ of polymer$\times$sec$\times$cm Hg)).

Uptake (Lysozyme, Lipocalin, Mucin)

Lysozyme uptake was measured as follows: The lysozyme solution used for the lysozyme uptake testing contained lysozyme from chicken egg white (Sigma, L7651) solubilized at a concentration of 2 mg/ml in phosphate saline buffer supplemented by Sodium bicarbonate at 1.37 g/l and D-Glucose at 0.1 g/l.

Three lenses for each example were tested using each protein solution, and three were tested using PBS (phosphate buffered saline) as a control solution. The test lenses were blotted on sterile gauze to remove packing solution and aseptically transferred, using sterile forceps, into sterile, 24 well cell culture plates (one lens per well) each well containing 2 ml of lysozyme solution. Each lens was fully immersed in the solution. 2 ml of the lysozyme solution was placed in a well without a contact lens as a control.

The plates containing the lenses and the control plates containing only protein solution and the lenses in the PBS, were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile conical tubes (1 lens per tube), each tube containing a volume of PBS determined based upon an estimate of lysozyme uptake expected based upon on each lens composition. The lysozyme concentration in each tube to be tested needs to be within the albumin standards range as described by the manufacturer (0.05 microgram to 30 micrograms). Samples known to uptake a level of lysozyme lower than 100 μg per lens were diluted 5 times. Samples known to uptake levels of lysozyme higher than 500 μg per lens (such as etafilcon A lenses) are diluted 20 times.

1 ml aliquot of PBS was used for all samples other than etafilcon. 20 ml were used for etafilcon A lens. Each control lens was identically processed, except that the well plates contained PBS instead of lysozyme solution.

Lysozyme uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lysozyme solution.

Optical density was measured using a SynergyII Microplate reader capable for reading optical density at 562 nm.

Lipocalin uptake was measured using the following solution and method. The lipocalin solution contained B Lactoglobulin (Lipocalin) from bovine milk (Sigma, L3908) solubilized at a concentration of 2 mg/ml in phosphate saline buffer (Sigma, D8662) supplemented by sodium bicarbonate at 1.37 g/l and D-Glucose at 0.1 g/l.

Three lenses for each example were tested using the lipocalin solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of lipocalin solution. Each lens was fully immersed in the solution. Control lenses were prepared using PBS as soak solution instead of lipocalin. The plates containing the lenses immersed in lipocalin solution as well as plates containing control lenses immersed in PBS, were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile 24 well plates each well containing 1 ml of PBS solution.

Lipocalin uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lipocalin solution. Optical density was measured using a SynergyII Micro-plate reader capable for reading optical density at 562 nm.

Mucin uptake was measured using the following solution and method. The Mucin solution contained Mucins from bovine submaxillary glands (Sigma, M3895-type 1-S) solubilized at a concentration of 2 mg/ml in phosphate saline buffer (Sigma, D8662) supplemented by sodium bicarbonate at 1.37 g/l and D-Glucose at 0.1 g/l.

Three lenses for each example were tested using Mucin solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of Mucin solution. Each lens was fully immersed in the solution. Control lenses were prepared using PBS as soak solution instead of lipocalin.

The plates containing the lenses immersed in Mucin as well as plates containing control lenses immersed in PBS were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile 24 well plates each well containing 1 ml of PBS solution.

Mucin uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in Mucin solution. Optical density was measured using a SynergyII Micro-plate reader capable for reading optical density at 562 nm.

The kinetic half lives for components may be determined as follows. The components for each kinetics example were weighed into a 20 mL amber borosilicate glass scintillation vial (Wheaton 320 brand; Catalogue #80076-576, or equivalent). Vials were capped (using PTFE lined green cap, Qorpak; Supplier #5205/100, Catalogue #16161-213) and rolled on jar roller until all solids were dissolved and a homogeneous mixtures were obtained.

Degas

Figure 2:
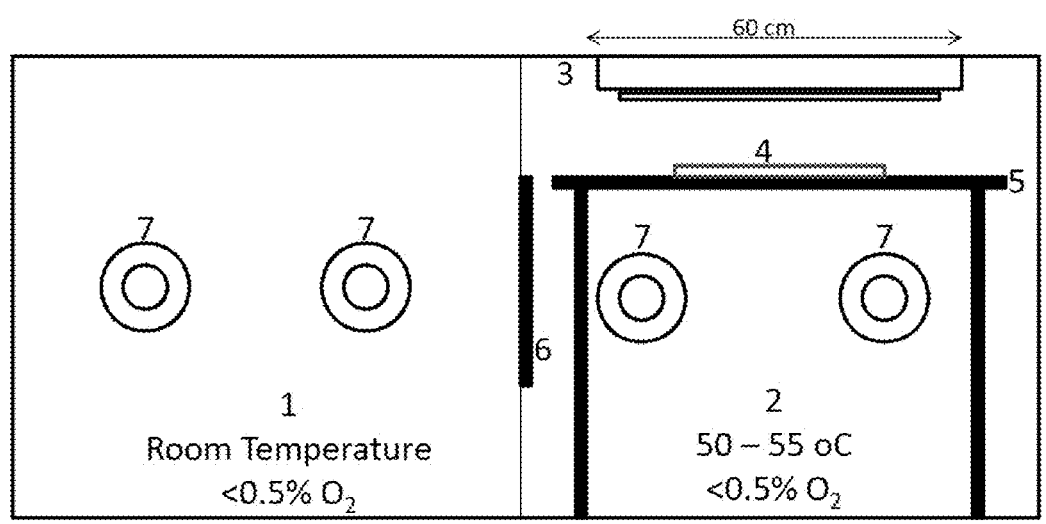
FIG. 2 is a schematic of the dual compartment cure box used for the kinetic evaluations.

Reactive monomer mixes were degassed under vacuum, under yellow light for 7-10 minutes, and back-filling with nitrogen after breaking vacuum. Vials were quickly capped and placed in compartment 1 of a two compartment nitrogen cure box, via the gated aperature, 7, as shown in FIG. 2. The conditions in compartment 1 were room temperature and <0.5% oxygen (using continuous nitrogen purge).

Nitrogen Cure Box—Compartment 2

The oxygen level in both compartments was maintained by continuous/constant nitrogen purge. The temperature in Compartment 2 was maintained by a heater (COY, Laboratory Products Inc.). The nitrogen cure box was allowed to equilibrate for a minimum of 4 hours prior to performing each kinetics study. The degassed reactive mixture (in tightly capped amber vial) was placed in compartment 1 during the equilibration period.

Light Source and Intensity Setting

Figure 3:
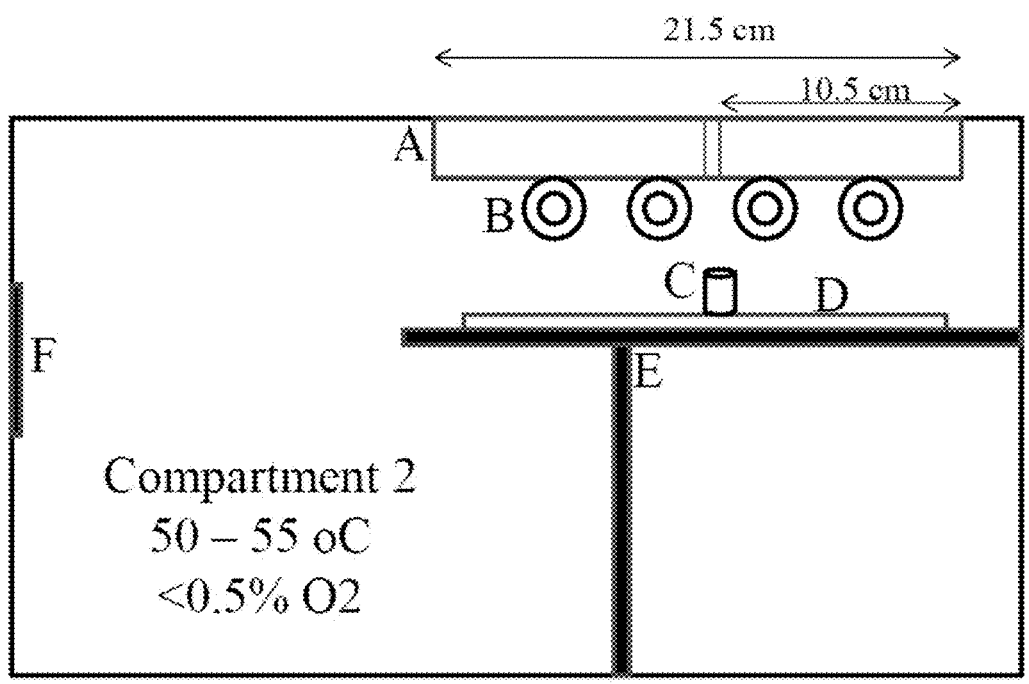
FIG. 3 is a schematic of compartment 2 of the cure box show in FIG. 2.

As depicted in FIG. 3, 2 fluorescent light fixtures (Lithonia Lighting Fluorescent Luminaire (Gas Tube Luminaire), 60 cm×10.5 cm) each equipped with 2 fluorescent lamps (Philips TLK 40 W/03, 58 cm) were arranged in parallel. The cure intensity was attenuated by adjusting the height of the shelf (shown in FIGS. 2 and 3) relative to the light source. The intensity at a given shelf height was measured by placing the sensor of a calibrated radiometer/photometer on the mirrored surface, consistent with the position of the sample, as shown in FIG. 3. The sensor was placed directly under the space between the $2^{nd}$ and $3^{rd}$ lamps in the 4 lamps arrangement.

Using a calibrated analytical balance (4 decimal places) the weight of a clear borosilicate glass scintillation vial (Wheaton 986541) with cap (white cap with polyethylene insert) was determined. The vial with cap was transferred to Compartment 1 of the Nitrogen Cure Box. The cap was unscrewed and using a calibrated 10-100 μL Eppendorf Pipet, 100 μL of the Reactive Monomer Mixture was transferred into the vial. The vial was tightly capped, quickly moved into Compartment 2, via door 6, and placed on the mirrored surface 4, as shown in FIG. 2. The sample was placed directly under the space between the $2^{nd}$ and $3^{rd}$ lamps in the 4 lamps arrangement. The light source 3, was turned on and the sample was exposed for a specified time period. Although the light source was set at 4-5 mW/cm$^2$, the actual intensity reaching the sample is 0.7-1.3 mW/cm$^2$, due the cap on the sample glass vials. After exposure, the light source 3, was turned off and the vial (with cap) was re-weighed to determine the sample weight by difference. Using a calibrated 500-5000 μL Eppendorf Pipet, 10 mL HPLC grade methanol was added to the vial.

Aliquots (100 μL) of the Reactive Monomer Mixture were pipetted into separate borosilicate glass scintillation vials and the above procedure described above was performed to generate samples at the following minimum time points (minutes): 0, 0.25, 0.50, 0.75, 1, 2, 4, 6, 8, 10.

Cured polymers were extracted in methanol overnight by gently shaking at room temperature.

Extracts were analyzed for residual components by High Performance Liquid Chromatography with UV detection (HPLC/UV) using the following procedures.

Quantitation of the mPDMS in the extracts was performed against external calibration standards (about 6-11, using the response of the n=6 oligomer), typically covering the range of 1 μg/mL-800 μg/mL. If the concentrations of mPDMS in the extracts were outside the calibration range, the extracts were diluted with methanol to render concentrations within the calibration range for more accurate quantitation.

Chromatographic Conditions
Column: Agilent Zorbax Eclipse XDB18, 4.6×50 mm×1.8 μm
Column Temperature: 30° C.
UV Detector: 217 nm
Injection Volume: 20 μL
Mobile Phase
Eluent A: De-ionized
Eluent B: Acetonitrile
Eluent C: Isopropanol
Flow Rate: 1 mL/min

| Time (mins) | % A | % B | % C |
|---|---|---|---|
| 0.0 | 50 | 48 | 2 |
| 0.5 | 50 | 48 | 2 |
| 2.0 | 0 | 60 | 40 |
| 5.0 | 0 | 60 | 40 |
| 5.1 | 0 | 30 | 70 |
| 8.0 | 0 | 30 | 70 |
| 8.1 | 50 | 48 | 2 |
| 10.0 | 50 | 48 | 2 |

Quantitation of the components in the extracts other than mPDMS was performed against external calibration standards (about 6-11) for each component, typically covering the range of 1 μg/mL-800 μg/mL. If the concentrations of components in the extracts were outside the calibration range, the extracts were appropriately diluted with methanol to render concentrations within the calibration range for more accurate quantitation.

Chromatographic Conditions
Column: Agilent Zorbax Eclipse Plus 18, 4.6×75 mm×1.8 μm
Column Temperature: 30° C.
UV Detector: 217 nm
Injection Volume: 5 μL
Mobile Phase
Eluent A: De-ionized water with 0.05% $H_3PO_4$
Eluent B: Acetonitrile with 0.05% $H_3PO_4$
Eluent C: Methanol
Flow Rate: 1 mL/min

| Time (mins) | % A | % B | % C |
|---|---|---|---|
| 0 | 95 | 5 | 0 |
| 5 | 95 | 5 | 0 |
| 15 | 0 | 100 | 0 |
| 23 | 0 | 100 | 0 |
| 24 | 0 | 30 | 70 |
| 28 | 0 | 30 | 70 |
| 29 | 95 | 5 | 0 |
| 35 | 95 | 5 | 0 |

Calculations
1. At each time point the following values are determined: The concentration (ng/mL) of each component in the sample extract.

The concentration of each component in the sample extract, expressed as a percent of the sample weight as follows:

% Component=[(μg/mL*Volume of Extract*Dilution Factor*$10^{-6}$ g/μg)/(g Sample Weight)]*100

The percent unreacted component present, expressed as a percent relative to $T_0$ (where $T_0$ represented 100% unreacted component)

% at $T_x$=(% Measured at $T_x$/% Measured at $T_0$)*100

2. Using the % Component calculated above, the concentration of each component in μmoles/g, is calculated as follows:

μmoles/g=(% Component*$10^3$)/(Molecular Weight of Component)

3. Using the concentration of each component determined in μmoles/g in step 2, the concentration at $Time_x$ was expressed as Log $[A_x]/[A_o]$, where $[A_x]$ is the concentration of component A at x minutes and $[A_o]$ is the concentration of component A at 0 minutes ($T_0$)

The expression Log $[A_x]/[A_0]$ was determined for each time point.

First order kinetics were assumed for determining both the polymerization kinetics rate and half life for each component. The following equations were used for calculating polymerization rate Log $[A]/[A_0]$=$-kt/2.303$ and half life ln $[A_0]/[0.5A_0]$=$kt_{1/2}$ or $t_{1/2}$=$0.693/k$ For each component, a plot of Log $[A_x]/[A_0]$ versus time (minutes) was generated. Typically, the data points (x, y) that best correspond to linear growth (shorter cure times) were plotted and the data were fitted to a linear equation.

Using the slope, the kinetic rate constant (k) of each component was evaluated from the following equation:

k(minute$^{-1}$)=Slope*$-2.303$

The half-life (minutes) of each component was evaluated from the following equation:

$t_{1/2}$=$0.693/k$

The evaluated half-life for each component was compared to the data generated for the percent of each component relative to $T_0$, at each time point. Typically for each component, the time taken to attain 50% consumption was close to the half-life based on $1^{st}$ order kinetics In cases where the two were significantly different (typically about 30% for half-life of less than about 1 minute, 25% for half-life less than about 2.5 minutes but greater than 1 minute and 20% for half-life greater than 2.5 minutes), the data points (x, y) were re-evaluated to generate kinetic rate constants (k) which would provide half-lives (based on $1^{st}$ order considerations) more consistent (within 20%) with the measured values.

The Examples below further describe this invention, but do not limit the invention. They are meant only to suggest a method of practicing the invention. Those knowledgeable in the field of contact lenses as well as other specialties may find other methods of practicing the invention. However, those methods are deemed to be within the scope of this invention.

Some of the other materials that are employed in the Examples are identified as follows:

EXAMPLES

The following abbreviations are used in the examples below:
FC Front mold curves
BC Back mold curves
NVP N-vinylpyrrolidone
SiMAA 3-(methacryloxy-2-hydroxypropoxy) propylbis(trimethylsiloxy)methyl silane,
DMA N,N-dimethylacrylamide
EGVE ethylene glycol vinyl ether
HEMA 2-hydroxyethyl methacrylate
HEAA hydroxyethylacrylamide
mPDMS 800-1000 MW ($M_n$) monomethacryloxypropyl terminated mono-n-butyl terminated polydimethylsiloxane
OH-mPDMS α-(2-hydroxy-1-methacryloxypropyloxypropyl)-ω-butyl-decamethylpentasiloxane, (MW 612 g/mol), prepared as in Example 8 of US20100249356 A1
Norbloc 2-(2'-hydroxy-5-methacrylyloxyethylphenyl)-2H-benzotriazole
D3O 3,7-dimethyl-3-octanol
TEGDMA tetraethyleneglycol dimethacrylate
TRIS 3-methacryloxypropyltris(trimethylsiloxy)silane
acPDMS bis-3-methacryloxy-2-hydroxypropyloxypropyl polydimethylsiloxane (MW about 1000 g/mole)
CGI 819 bis(2,4,6-trimethylbenzoyl)-phenylphosphineoxide
EtOAc ethyl acetate
DA decanoic acid
Macromer A Described in Example 25 of U.S. Pat. No. 6,943,203
GMMA 2,3-dihydroxypropyl methacrylate
TAA t-amyl alcohol
ETOH ethanol
SA-2 N-(2,3-dihydroxypropane)-N'-(propyl tetra(dimethylsiloxy)dimethylbutylsilane)acrylamide, as shown in Formula XI

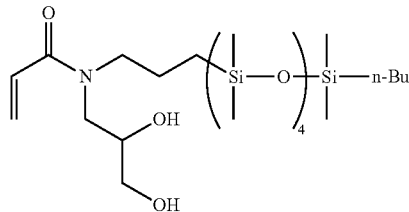

VMA N-vinyl-N-methyl acetamide

Examples 1-5

Reaction mixtures were formed by mixing the components listed in Table 1 and degassed by applying vacuum at ambient temperature for about 17(±3) minutes. The reaction mixtures (75 μL) were then dosed at room temperature and <0.5% $O_2$, into thermoplastic contact lens molds (FC—Zeonor, BC Polypropylene) which had been degassed in $N_2$ box at RT (Compartment 1, FIG. 1) for a minimum of 12 hours prior to dosing. The BC was placed on the FC mold to produce 8 BC/FC assemblies in a pallet. Eight pallets were assembled and moved into the cure compartment (Compartment 2, FIG. 1). The mold assembly was placed on a mirrored surface, and a quartz plate (0.50 mm thick) was placed on top of the BC mold. The lenses were cured for 18 minutes, at an intensity of 4-5 mW/cm$^2$, <0.5% $O_2$, and 50-55° C.

The lens molds were separated. The lenses remained in the front curve mold and were demolded dry via striking the underside of the FC mold.

Lenses were extracted in DI water (64 lenses in 500 mL) in a glass jar at ambient temperature for 90 minutes, with rolling. The lenses were "stored in borate buffered packing solution in lens vials and sterilized at 122° C. for 30 minutes.

TABLE 1

|  | 1 | 2 | 3 | 4 | 5 |
|---|---|---|---|---|---|
| mPDMS 1000 | 0.00 | 5.00 | 10.00 | 15.00 | 20.00 |
| OH-mPDMS, n = 4 | 40.00 | 35.00 | 30.00 | 25.00 | 20.00 |
| NVP | 45.50 | 45.50 | 45.50 | 45.50 | 45.50 |
| HEMA | 10.75 | 10.75 | 10.75 | 10.75 | 10.75 |
| TEGDMA | 1.50 | 1.50 | 1.50 | 1.50 | 1.50 |
| Norbloc | 2.00 | 2.00 | 2.00 | 2.00 | 2.00 |
| CGI 819 | 0.25 | 0.25 | 0.25 | 0.25 | 0.25 |
| [mPDMS]:HOmPDMS[1] | 0 | 0.0087 | 0.2 | 0.37 | 0.61 |

[1]molar ratio

The blend of Example 5 was slightly hazy, indicating slight inhomogeneity of the reaction mixture. The properties of the lenses of Examples 1 and 4 are shown in Table 2, below.

TABLE 2

| | | | | Mechanicals | | |
|---|---|---|---|---|---|---|
| Ex.# | % $H_2O$ | % Haze | DCA | Mod. (psi) | Elong. (%) | Dk |
| 1 | 48.1 (0.1) | 9 (1) | 63 (5) | 195.0 (12.0) | 111.8 (23.1) | 70 |
| 4 | 47.8 (0.1) | 17 (1) | 59 (4) | 178.4 (17.8) | 110.6 (25.0) | 82 |

The lenses from Example 1 were brittle and some lenses shattered or cracked during the mechanical release from the lens mold. The level of observed brittleness decreased, and demolding and handling of the dry lenses increased as the concentration of mPDMS increased. Example 4, which contained 15 wt % mPDMS, and molar ratio of mPDMS:HOmPDMS of 0.37 displayed good release and demolding. The lenses of Example 4 also displayed desirable water content, haze and Dk.

Examples 6-10

Lenses were made using the procedure described in Examples 1-5, but the formulations shown in Table 3.

TABLE 3

| | Ex # | | | | |
|---|---|---|---|---|---|
| | 6 | 7 | 8 | 9 | 10 |
| mPDMS 1000 | 15 | 15 | 15 | 15 | 15 |
| OH-mPDMS, n = 4 | 25 | 25 | 25 | 25 | 0 |
| SiMAA | 0 | 0 | 0 | 0 | 25 |
| NVP | 46 | 46.25 | 46.50 | 46.75 | 46.50 |
| HEMA | 10.75 | 10.75 | 10.75 | 10.75 | 10.75 |

TABLE 3-continued

| | Ex # | | | | |
|---|---|---|---|---|---|
| | 6 | 7 | 8 | 9 | 10 |
| TEGDMA | 1 | 0.75 | 0.50 | 0.25 | 0.50 |
| Norbloc | 2 | 2 | 2 | 2 | 2 |
| CGI 819 | 0.25 | 0.25 | 0.25 | 0.25 | 0.25 |

TABLE 4

| | | | | Mechanicals | | |
|---|---|---|---|---|---|---|
| Ex | [TEGDMA] | % $H_2O$ | % Haze | DCA | Mod. (psi) | Elong. (%) | Dk |
| 6 | 1 | NT | NT | NT | NT | NT | NT |
| 7 | 0.75 | 53.8 (0.2) | 6 (1) | 57 (2) | 129.1 (6.5) | 198.3 (40.1) | 82 |
| 8 | 0.5 | 54.7 (0.2) | 8 (1) | 58 (8) | 97.6 (9.7) | 244.7 (65.1) | 82 |
| 9 | 0.25 | 59.0 (0.0) | 36 (1) | NT | 78.8 (3.4) | 259.7 (36.8) | 85 |
| 10 | 0.5 | 52.1 (0.2) | 7 (1) | 76 (2) | 172.6 (15.4) | 171.4 (39.1) | 54 |
| 11 | 0.5 | 52.8 (0.1) | 7 (1) | 67 (2) | 159.1 (13.9) | 168.4 (48.0) | 54 |

All lenses were clear, as shown by the low haze values, and felt lubricious when hydrated. The lenses from Example 10 were brittle and some shattered and cracked upon demolding. The lenses of Examples 8 and 9 displayed moduli below about 100 psi, which is desirable in soft contact lens applications. The series of Examples 6-11 shows that crosslinker concentrations up to about 0.8 wt % (1.8 mmole per 100 g reactive components), and in some embodiments between about 0.2 and about 0.6 wt % (0.6 to 2.4 mmole per 100 g reactive components) provide desirable moduli.

Example 11

Lenses were made as in Example 10, and extracted using the following isopropanol "step down" into PS:
25/75 iPA/$H_2O$ (10 mins), $H_2O$ (30 mins), $H_2O$ (10 mins), $H_2O$ (10 mins),
The properties are shown in Table 4, above.

Examples 12-16

Contact lenses were made from the formulations in Table 5, using the procedure described in Examples 1-5.

TABLE 5

| | Ex# | | | | |
|---|---|---|---|---|---|
| | 12 | 13 | 14 | 15 | 16 |
| | Wt % | | | | |
| mPDMS 1000 | 15.00 | 15.00 | 15.00 | 15.00 | 15.00 |
| OH-mPDMS, n = 4 | 25.00 | 25.00 | 25.00 | 25.00 | 25.00 |
| NVP | 57.25 | 54.50 | 52.50 | 50.50 | 46.50 |
| HEMA | 0.00 | 2.75 | 4.75 | 6.75 | 10.75 |
| TEGDMA | 0.50 | 0.50 | 0.50 | 0.50 | 0.50 |
| Norbloc | 2.00 | 2.00 | 2.00 | 2.00 | 2.00 |
| CGI 819 | 0.25 | 0.25 | 0.25 | 0.25 | 0.25 |

The lenses of Example 12 were difficult to mechanically release from the mold and became hazy in packing solution. The properties of the lenses of Example 12 were not measured. The properties of the lenses of Examples 13-16 were measured and are reported in Table 6.

TABLE 6

| | | | | | | | Mechanicals | | |
|---|---|---|---|---|---|---|---|---|---|
| Ex# | % HEMA | % NVP | HEMA: NVP | % $H_2O$ | % Haze | DCA | Mod. (psi) | Elong. (%) | Dk |
| 13 | 2.75 | 54.50 | 0.043 | 63.0 (0.3) | 57 (5) | 69 (10) | 77.7 (3.7) | 157.7 (37.6) | 87 |
| 14 | 4.75 | 52.50 | 0.077 | 60.0 (0.5) | 35 (1) | 71 (16) | 86.3 (5.2) | 194.9 (63.1) | 83 |
| 15 | 6.75 | 50.50 | 0.114 | 57.4 (0.4) | 9 (0) | 49 (5) | 93.1 (5.8) | 219.7 (50.0) | 86 |
| 16 | 10.75 | 46.50 | 0.197 | 54.7 (0.2) | 8 (1) | 58 (8) | 97.6 (9.7) | 244.7 (65.1) | 82 |

Examples 12-16 show that increasing levels of hydroxylalkyl methacrylates, such as HEMA in the zero diluent formulations decrease haze levels, decrease distortions in the resulting lenses and improve mechanical release from the molds.

The HO:Si ratio (including both HEMA and HO-mP-DMS) for Example 12 was 0.11, while the ratios for Examples 13-16 ranged from 0.17 (Example 13) to 0.33 (Example 16).

Examples 17-19

Contact lenses were made from the formulations in Table 7, using the procedure described in Examples 1-5. The properties were measured and are reported in Table 8.

TABLE 7

| | Wt % | | |
|---|---|---|---|
| | Ex# | | |
| Component | 17 | 18 | 19 |
| % Si | 8.89 | 9 | 11.5 |
| HO:Si[1] | 0.39 | 0.37 | 0.24 |
| mPDMS 1000 | 10 | 12.75 | 16.75 |
| OH-mPDMS, n = 4 | 25 | 21.75 | 27.5 |
| NVP | 51.5 | 52 | 46.5 |
| HEMA | 10.75 | 10.75 | 6.75 |
| TEGDMA | 0.5 | 0.5 | 0.5 |
| Norbloc | 2 | 2 | 2 |
| CGI 819 | 0.25 | 0.25 | 0.25 |

HO:Si = all hydroxyl in RMM

TABLE 8

| | | % | | Mechanicals | | |
|---|---|---|---|---|---|---|
| Ex. # | % $H_2O$ | Haze | DCA | Mod. (psi) | Elong. (%) | Dk |
| 17 | 60.3 (0.1) | 6 (1) | 50 (4) | 89 (6) | 213 (40) | 60 |
| 18 | 59.3 (0.2) | 7 (0) | 63 (14) | 88 (5) | 171 (46) | 65 |
| 19 | 53.4 (0.1) | 13 (1) | 67 (16) | 118 (6) | 188 (67) | 98 |

The lenses of Example 17 displayed a good balance of properties, but were brittle upon mechanical release. About 25% of the lenses displayed fractures upon hydration, and some lenses remained on the back curve mold upon mechanical release.

The lenses of Examples 18 and 19, had increased concentrations of mPDMS and Si content. These lenses displayed excellent mechanical release, with no fractures observed in the hydrated lenses and a desirable balance of lens properties. The lenses of Example 19 displayed a Dk of 98 and a water content of greater than 50%.

Comparative Example 1 and Examples 20-27

Lenses were made from the formulations of Table 9, using the procedure described in Examples 1 through 5. The properties were measured and are shown in Table 10. Biometric data (lipocalin, mucin, lysozyme uptake and lysozyme activity) were also measured and are shown in Table 11.

All lenses in Examples 21 through 26 displayed a desirable balance of lens properties and uptake characteristics.

Lenses of Example 27 were hard and brittle after curing and shattered during mechanical dry release. However, lenses of Example 27 were released successfully using 70/30 IPA/water.

Examples 29-33

Lenses were made from the formulations of Table 13, using the procedure described in Examples 1 through 5. The properties were measured and are shown in Table 14.

TABLE 9

| Comp | Wt % | | | | | | | | |
|---|---|---|---|---|---|---|---|---|---|
| Ex.# | 20 | 21 | 22 | 23 | 24 | 25 | 26 | 27 | 28 |
| % Si | 7.1 | 8 | 9 | 10.5 | 11.5 | 9 | 10.5 | 9.2 | 11.5 |
| mPDMS 1000 | 9.35 | 11.5 | 12.75 | 15 | 16.50 | 12.75 | 15 | 0 | 16.5 |
| OH-mPDMS, n = 4 | 18 | 19 | 21.75 | 25 | 27.50 | 21.75 | 25 | 40 | 27.5 |
| NVP | 63.15 | 60 | 56.00 | 50.5 | 46.5 | 56 | 50.5 | 50.88 | 46.5 |
| GMMA | 0 | 0 | 0 | 0 | 0 | 6.73 | 6.73 | 6.62 | 6.73 |
| HEMA | 6.73 | 6.73 | 6.73 | 6.73 | 6.73 | 0 | 0 | 0 | 0 |
| Blue HEMA | 0.02 | 0.02 | 0.02 | 0.02 | 0.02 | 0.02 | 0.02 | 0 | 0.02 |
| TEGDMA | 0.5 | 0.5 | 0.5 | 0.5 | 0.5 | 0.5 | 0.5 | 0.25 | 0.5 |
| Norbloc | 2 | 2 | 2 | 2 | 2 | 2 | 2 | 2 | 2 |
| CGI 819 | 0.25 | 0.25 | 0.25 | 0.25 | 0.25 | 0.25 | 0.25 | 0.25 | 0.25 |

TABLE 10

| Ex # | %[Si]; HMA | % H$_2$O | % Haze | RI | DCA | Sessile Drop | Mod. (psi) | Elong. (%) | Dk |
|---|---|---|---|---|---|---|---|---|---|
| 20 | 7.1; HEMA | 68.5 (0.1) | 5 (0) | NT | 36 (9) | 44 (3) | 65 (5) | 260 (47) | 59.2 |
| 21 | 8.0; HEMA | 63.2 (0.3) | 8 (1) | 1.3925 | 38 (8) | 39 (5) | 76 (5) | 215 (53) | 61.3 |
| 22 | 9.0; HEMA | 61.3 (0.1) | 9 (1) | 1.3927 | 43 (10) | 39 (2) | 83 (9) | 244 (35) | 76.2 |
| 23 | 10.5; HEMA | 56.9 (0.2) | 6 (1) | 1.4012 | 38 (9) | 39 (3) | 100 (9) | 249 (59) | 88.4 |
| 24 | 11.5; HEMA | 53.7 (0.2) | 7 (1) | NT | 60 (6) | 63 (6) | 112 (5) | 224 (31) | 103.7 |
| 25 | 9.0; GMMA | 61.8 (0.1) | 4 (1) | 1.3960 | 44 (8) | 46 (4) | 93 (6) | 246 (38) | 73.5 |
| 26 | 10.5; GMMA | 57.3 (0.0) | 3 (0) | 1.4015 | 56 (16) | 42 (4) | 100 (7) | 212 (50) | 81.8 |
| 27 | 9.2; GMMA | 58.5 (0) | 10 (3) | NT | 39 (5) | NT | 120 (6) | 184 (22) | 61.2 |
| 28 | 11.5: GMMA | 54.3 (0.2) | 8 (0) | NT | 91 (12) | NT | 104.1 (5.9) | 216 (36.7) | 90.7 |

TABLE 12

| Ex. # | %[Si]; Hydrophile | Lipocalin (µg/Lens) | Mucin (µg/Lens) | Lysozyme (µg/Lens) | % Active Lysozyme |
|---|---|---|---|---|---|
| 21 | 8.0; HEMA | 3.75 (0.06) | 5.02 (0.04) | 5.61 (0.05) | 81 (4) |
| 22 | 9.0; HEMA | 4.15 (0.16) | 5.44 (0.10) | 6.45 (0.04) | 81 (3) |
| 25 | 9.0; GMMA | 3.79 (0.13) | 4.92 (0.15) | 6.15 (0.20) | 82 (6) |
| 23 | 10.5; HEMA | 3.76 (0.57) | 5.13 (0.16) | 6.39 (0.06) | 81 (7) |
| 26 | 10.5; GMMA | 3.54 (0.28) | 4.85 (0.10) | 5.81 (0.27) | 77 (6) |

TABLE 13

| | Wt % Ex# | | | | |
|---|---|---|---|---|---|
| | 29 | 30 | 31 | 32 | 33 |
| % Si | 7.32 | 8.47 | 9.62 | 10.77 | 11.92 |
| mPDMS 1000 | 5.00 | 5.00 | 5.00 | 5.00 | 5.00 |
| OH-, mPDMS n = 4 | 25.00 | 30.00 | 35.00 | 40.00 | 45.00 |
| PVP K90 | 7.00 | 7.00 | 7.00 | 7.00 | 7.00 |
| NVP | 49.50 | 44.50 | 39.50 | 34.50 | 29.50 |
| HEMA | 10.75 | 10.75 | 10.75 | 10.75 | 10.75 |
| TEGDMA | 0.50 | 0.50 | 0.50 | 0.50 | 0.50 |
| Norbloc | 2.00 | 2.00 | 2.00 | 2.00 | 2.00 |
| CGI 819 | 0.25 | 0.25 | 0.25 | 0.25 | 0.25 |

TABLE 14

| Ex# | % H$_2$O | % Haze | DCA | Mechanicals Mod. (psi) | Elong. (%) | Dk |
|---|---|---|---|---|---|---|
| 29 | 65.2 (0.2) | 5 (0) | 63 (6) | 72 (6) | 227 (61) | 56 |
| 30 | 60.5 (0.2) | 6 (0) | 58 (6) | 102 (7) | 242 (33) | 60 |
| 31 | 57.0 (0.1) | 7 (1) | 81 (10) | 100 (7) | 260 (27) | 77 |
| 32 | 53.0 (0.5) | 6 (0) | 100 (5) | 117 (9) | 255 (27) | 86 |
| 33 | 48.9 (0.0) | 5 (1) | 101 (8) | 149 (17) | 250 (53) | 94 |

The lenses of Examples 29 and 30 display a desirable balance of properties. As the concentration of NVP in the formulations drops below about 40 wt %, the advancing contact angle (DCA) increases above 80° C., which is undesirable for a contact lens without a surface treatment or coating. This is surprising as all the formulations contain 5 wt % PVP (K90) which has been shown to dramatically improve the wettability of contact lenses made from formulations without PVP. In this series, the concentration of HO-mPDMS was also increased from 25 wt % in Example 29 to 45 wt % in Example 33. Examples 32 displays a modulus of 117 psi, which is marginally acceptable for some contact lenses and could be adjusted by decreasing the crosslinker content. Example 33 displays a modulus of 149 psi which is undesirably high, but could be decreased by lowering the crosslinker concentration as in Example 28.

Examples 34-39

Lenses were made from the formulations of Table 15, using the procedure described in Examples 1 through 5. The properties were measured and are shown in Table 16.

TABLE 15

| Component | Wt % | | | | | |
|---|---|---|---|---|---|---|
| Ex# | 34 | 35 | 36 | 37 | 38 | 39 |
| mPDMS 1000 | 10 | 7 | 7 | 7 | 10 | 10 |
| OH-mPDMS, n = 4 | 25 | 25 | 30 | 35 | 32 | 35 |
| PVP K30 | 7 | 7 | 7 | 7 | 7 | 7 |
| NVP | 45.25 | 48.25 | 43.25 | 38.25 | 38.25 | 35.25 |
| HEMA | 10 | 10 | 10 | 10 | 10 | 10 |
| TEGDMA | 0.5 | 0.5 | 0.5 | 0.5 | 0.5 | 0.5 |
| Norblock | 2 | 2 | 2 | 2 | 2 | 2 |
| CGI 819 | 0.25 | 0.25 | 0.25 | 0.25 | 0.25 | 0.25 |

TABLE 16

| Ex# | % H$_2$O | % Haze | DCA | Mechanicals Mod. (psi) | Elong. (%) | Dk |
|---|---|---|---|---|---|---|
| 34 | 61.7 (0.2) | 6 (1) | 68 (13) | 86 (4) | 229 (41) | 61 |
| 36 | 58.6 (0.1) | 8 (0) | 75 (11) | 99 (10) | 251 (40) | 78 |
| 37 | 55.3 (0.0) | 10 (1) | 105 (6) | 111 (14) | 248 (34) | 88 |
| 38 | 56.1 (0.4) | 13 (1) | 102 (6) | 99 (8) | 248 (56) | 86 |
| 39 | 53.3 (0.0) | 14 (1) | 120 (5) | 119 (14) | 235 (39) | 95 |

Similar to Examples-33, formulations which contained less than about 40 wt % NVP did not display advancing contact angles less than about 80° C. Also, considering Examples 37 and 39, concentrations of HO-mPDMS greater than about 32 wt % displayed moduli which may be higher than desirable in some cases. These moduli could be decreased by decreasing the crosslinker concentration, decreasing the HO-mPDMS concentration or a combination.

Examples 40-43 and Comparative Examples 1 and 2

Contact lenses were made from the Formulations of listed in Table 17.3 using the method described in Examples 1-5. The properties of the lenses were measured and are shown in Table 18, below.

TABLE 17

| Comp. | Ex. 40 | Ex. 41 | CE1 | CE2 | Ex. 42 | Ex. 43 |
|---|---|---|---|---|---|---|
| OH-mPDMS | 40 | 40 | 40 | 40 | 0 | 0 |
| SA2 | 0 | 0 | 0 | 0 | 41 | 40 |
| NVP | 50.5 | 50.5 | 0 | 0 | 51.5 | 50.5 |
| DMA | 0 | 0 | 50.5 | 50.5 | 0 | 0 |
| HEMA | 6.75 | 8.75 | 6.75 | 8.75 | 6.75 | 6.75 |
| TEGDMA | 0.5 | 0.5 | 0.5 | 0.5 | 0.5 | 0.5 |
| Norbloc | 2 | 0 | 2 | 0 | 0 | 2 |
| CGI 819 | 0.25 | 0.25 | 0.25 | 0.25 | 0.25 | 0.25 |

TABLE 18

| Ex. # | % H$_2$O | % Haze | DCA | Mechanicals Mod. (psi) | Elong. (%) | Dk |
|---|---|---|---|---|---|---|
| 40 | 58.4 (0.2) | 4 (0) | 44 (4) | 103 (11) | 220 (36) | 75 |
| 41 | 66.6 (0.1) | 24 (1) | 50 (3) | 63 (8) | 192 (76) | 79 |
| CE1 | 59.8 (0.1) | 5 (1) | 127 (14) | 54 (7) | 227 (52) | 49 |
| CE2 | 58.1 (0.2) | 3 (1) | 132 (7) | 78 (7) | 199 (39) | 49 |
| 42 | 67 (0.2) | 67 (2) | 51 (3) | 64 (7) | 229 (97) | 82 |
| 43 | 65.5 (0.1) | 8 (1) | 68 (7) | 105 (9) | 242 (49) | 57 |

The lenses of Examples 40 through 43 show desirable haze and wettability, as well as a balance of other desirable properties. Examples 42 and 43 were made using SA2, a methacrylamide silicone-containing component. Each of these Examples had ratios of the slow-reacting hydrophilic monomer half life:silicone-containing component half life greater than about 2. Comparative Examples 1 and 2 used DMA instead of NVP, and did not display desirable contact angles.

Comparing the modulii of Comparative Example 2 (54 psi, with Norbloc) and Comparative Example 3 (78 psi without Norbloc) it can be seen that the change in the reactivity rate for TEGDMA caused by the inclusion of Norbloc was sufficient to decrease crosslinking in the network of the resulting polymer. Thus, in additional to changing the amount of crosslinker, one can also choose a crosslinker with a different reactivity ratio to achieve a desired polymer structure and modulus. The same behavior is also observed comparing the SA2/NVP-containing formulations of Examples 42 and 43.

Examples 44-49

Lenses were made using the formulations shown in Table 84. The reaction mixtures were degassed by applying vacuum at ambient temperature for about 17(±3) minutes. The reaction mixture (75 µL) was then dosed at room temperature and <0.1% O$_2$, into thermoplastic contact lens molds (FC—Zeonor, BC Polypropylene) which had been degassed in N$_2$ box at RT (Compartment 1, FIG. 1) for a minimum of 12 hours prior to dosing. The BC was placed on the FC mold and the lenses were moved into Compartment 2 and cured for 20 minutes, at an intensity of 4-5 mW/cm², <0.1% O₂, and 62-65° C.

The molds for all the lenses were mechanically separated and the lenses remained in the FC. The lenses were dry released by pressing on the back of the front curve. Lenses were extracted in DI water All lenses were stored in borate buffered packing solution in lens vials and sterilized at 122° C. for 30 minutes.

Lens properties were measured and are shown in Table 20.

TABLE 19

| Ex.# | 44 | 45 | 46 | 47 | 48 | 49 |
|---|---|---|---|---|---|---|
| mPDMS 1000 | 19.35 | 19.35 | 19.35 | 19.35 | 19.35 | 19.35 |
| OH-mPDMS (n = 4) | 27.50 | 27.50 | 27.50 | 27.50 | 27.50 | 27.50 |
| VMA | 0.00 | 8.00 | 12.00 | 22.00 | 32.00 | 44.00 |
| HEMA | 6.50 | 6.50 | 6.50 | 6.50 | 6.50 | 6.50 |
| NVP | 44.00 | 36.00 | 32.00 | 22.00 | 12.00 | 0.00 |
| TEGDMA | 0.20 | 0.20 | 0.20 | 0.20 | 0.20 | 0.20 |
| TAC | 0.20 | 0.20 | 0.20 | 0.20 | 0.20 | 0.20 |
| Norbloc | 1.75 | 1.75 | 1.75 | 1.75 | 1.75 | 1.75 |
| CGI 819 | 0.50 | 0.50 | 0.50 | 0.50 | 0.50 | 0.50 |

TABLE 20

| | | | | Mechanicals | | | | |
|---|---|---|---|---|---|---|---|---|
| Lens | % H₂O | % Haze | DCA | Mod. (psi) | Elong. (%) | Dk | Res. NVP | Res. VMA |
| 44 | 55 (0) | 6 (0) | 55 (3) | 95 (6) | 270 (34) | 96 | 0.8 (0.02) | N/A |
| 45 | 56 (0) | 6 (0) | 67 (5) | 104 (7) | 233 (49) | 100 | NT | NT |
| 46 | 56 (0) | 5 (0) | 58 (4) | 100 (8) | 258 (36) | 100 | 0.51 (0.02) | 1.15 (0.08) |
| 47 | 58 (0) | 6 (0) | 56 (9) | 91 (9) | 223 (54) | 96 | 0.4 (0.04) | 2.2 (0.2) |
| 48 | 58 (0) | 7 (0) | 56 (5) | 92 (10) | 260 (62) | 103 | 0.3 (0.01) | 2.98 (0.06) |
| 49 | 58 (0) | 13 (2) | 50 (10) | 86 (7) | 262 (54) | 106 | N/A | 4.52 (0.61) |

Lenses having a desirable balance of properties were made from formulations comprising VMA and mixtures of VMA and NVP.

What is claimed is:

1. A silicone hydrogel comprising between about 8 and about 17 wt % silicon, an advancing dynamic contact angle of less than about 80° without surface modification formed from a reactive mixture comprising
at least one hydroxyl substituted, monofunctional polydialkylsiloxane monomer having between 2 and 120 dialkylsiloxane repeating units;
optionally one or more monofunctional siloxane monomer having 7 to 120 dialkylsiloxane repeating units, with the proviso that if said monofunctional, hydroxyl-containing siloxane monomer has less than 4 dialkylsiloxane repeating units or is of Formula IX

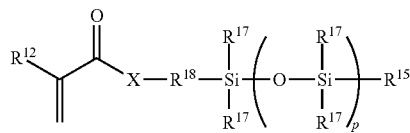

X is O or NR₁₆;
R₁₂ is H or methyl;
R₁₅ is a C₁ to C₄ alkyl;
Wherein p is 4-20,
R₁₇ is independently a C₁ to C₄ alkyl which may be fluorine substituted, or phenyl, or trimethylsiloxy groups;
R₁₈ is a divalent alkyl group substituted with at least one hydroxyl group;
X is O or NR₁₆; and R₁₆ is selected from H, C₁₋₄ alkyl;
at least one monofunctional, siloxane monomer having 7 to 120 dialkylsiloxane repeating units is included;
about 40-about 60 wt % of at least one slow reacting hydrophilic monomer;
at least one hydroxyl containing hydrophilic monomer, wherein the molar ratio of hydroxyl containing components to the slow reacting hydrophilic monomer is between about 0.15 to about 0.4, wherein the reactive mixture is free of diluent.

2. The silicone hydrogel of claim 1 comprising between about 8 to about 15 wt % silicon.

3. The silicone hydrogel of claim 1 wherein said monofunctional siloxane monomer comprises 7 to 60 dialkylsiloxane repeating units.

4. The silicone hydrogel of claim 1 wherein said monofunctional siloxane monomer comprises 7 to 30 dialkylsiloxane repeating units.

5. The silicone hydrogel of claim 1 wherein said monofunctional siloxane monomer comprises one or two hydroxyl groups.

6. The silicone hydrogel of claim 5 wherein said hydroxyl are located near either a monofunctional reactive end or a terminal end.

7. The silicone hydrogel of claim 1 wherein said silicone hydrogel comprises about 45 to about 60 wt % hydroxyalkyl (meth)acrylate or (meth)acrylamide.

8. The silicone hydrogel of claim 1 further comprising a Dk of at least about 60.

9. The silicone hydrogel of claim 1 further comprising a Dk of at least about 80.

10. The silicone hydrogel of claim 1 further comprising a water content of at least about 55%.

11. The silicone hydrogel of claim 1 further comprising a water content of at least about 60%.

12. The silicone hydrogel of claim 1 further comprising an advancing contact angle of less than about 80°.

13. The silicone hydrogel of claim 1 further comprising a % haze of less than about 50%.

14. The silicone hydrogel of claim 1 further comprising a % haze of less than about 10%.

15. The silicone hydrogel of claim 1 further comprising a modulus of less than about 120 psi.

16. The silicone hydrogel of claim 1 further comprising a modulus of about 100 psi or less.

17. The silicone hydrogel of claim 1 wherein said slow-reacting hydrophilic monomer comprises a reactive group selected from the group consisting of (meth)acrylamides, vinyls, allyls and combinations thereof.

18. The silicone hydrogel of claim 1 wherein said slow-reacting hydrophilic monomer comprises a reactive group selected from the group consisting of vinyls, allyls and combinations thereof and said monofunctional polydialkylsiloxane monomer and said monofunctional, hydroxyl-containing siloxane monomer comprise a reactive group selected from the group consisting of (meth)acrylates, styryls, amides and mixtures thereof.

19. The silicone hydrogel of claim 1 wherein said slow-reacting hydrophilic monomer comprises a reactive group selected from the group consisting of N-vinyl amides, O-vinyl carbamates, O-vinyl carbonates, N-vinyl carbamates, O-vinyl ethers, O-2-propenyl, wherein the vinyl or allyl groups may be further substituted with a methyl group.

20. The silicone hydrogel of claim 1 wherein said slow reacting hydrophilic monomer comprises at least one hydrophilic group selected from the group consisting of hydroxyls, amines, ethers, amides, ammonium groups, carboxylic acid, carbamates and combinations thereof.

21. The silicone hydrogel of claim 1 wherein said slow reacting hydrophilic monomer comprises at least one hydrophilic group selected from the group consisting of hydroxyls, ethers, amides, carboxylic acid combinations thereof.

22. The silicone hydrogel of claim 1 wherein said slow reacting hydrophilic monomer is selected from N-vinylamide monomer of Formula I, a vinyl pyrrolidone of Formula II-IV, n-vinyl piperidone of Formula V:

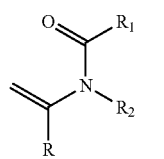

Formula I

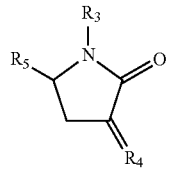

Formula II

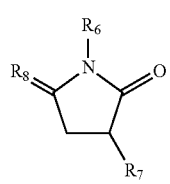

Formula III

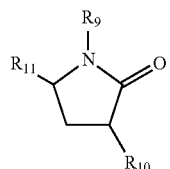

Formula IV

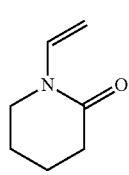

Formula V wherein R is H or methyl;
$R_1$, $R_2$, $R_3$, $R_6$, $R_7$, $R_{10}$, and $R_{11}$ are independently selected from H, $CH_3$, $CH_2CH_3$, $CH_2CH_2CH_3$, $C(CH_3)_2$;
$R_4$ and $R_5$ are independently selected from $CH_2$, $CHCH_3$ and $C(CH_3)$;
$R_5$ is selected from H, methyl, ethyl; and
$R_9$ is selected from $CH=CH_2$, $CCH_3=CH_2$, and $CH=CHCH_3$.

23. The silicone hydrogel of claim 22 wherein the slow-reacting hydrophilic monomer is selected from the vinyl pyrrolidone of Formula II or IV or the N-vinyl amide monomer of Formula I, and the total number of carbon atoms in $R_1$ and $R_2$ is 4 or less.

24. The silicone hydrogel of claim 22 wherein the slow-reacting hydrophilic monomer is selected from a vinyl pyrrolidone of Formula III or IV and $R_6$ is methyl, $R_7$ is hydrogen, $R_9$ is $CH=CH_2$, $R_{10}$ and $R_{11}$ are H.

25. The silicone hydrogel of claim 1 wherein the slow-reacting hydrophilic monomer is selected from ethylene glycol vinyl ether (EGVE), di(ethylene glycol) vinyl ether (DEGVE), N-vinyl pyrrolidone (NVP), 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, N-vinyl-N-methyl acetamide (VMA), N-vinyl-N-ethyl acetamide, N-vinyl-N-ethyl formamide, N-vinyl formamide, N-vinyl acetamide, N-vinyl isopropylamide, allyl alcohol, N-vinyl caprolactam, N-2-hydroxyethyl vinyl carbamate, N-carboxy-β-alanine N-vinyl ester; N-carboxyvinyl-β-alanine (VINAL), N-carboxyvinyl-α-alanine and mixtures thereof.

26. The silicone hydrogel of claim 1 wherein the slow-reacting hydrophilic monomer is selected from the group consisting of N-vinylpyrrolidone, N-vinylacetamide, 1-methyl-3-methylene-2-pyrrolidone, 1-methyl-5-methylene-2-pyrrolidone, 5-methyl-3-methylene-2-pyrrolidone, and mixtures thereof.

27. The silicone hydrogel of claim 1 wherein the slow-reacting hydrophilic monomer is selected from the group consisting of NVP, VMA and 1-methyl-5-methylene-2-pyrrolidone.

28. The silicone hydrogel of claim 1 wherein the slow-reacting hydrophilic monomer comprises NVP.

29. The silicone hydrogel of claim 1 wherein said hydroxyalkyl monomer is selected from hydroxyalkyl (meth)acrylate or (meth)acrylamide monomer of Formula X or a styryl compound of Formula XI

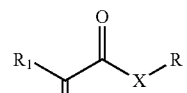

FORMULA X

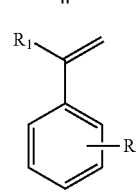

FORMULA XI wherein $R_1$ is H or methyl,
X is O or $NR_4$, $R_4$ is a H, $C_1$ to $C_4$ alkyl, which may be further substituted with at least one OH, and
R is selected from $C_2$-$C_4$ mono or dihydroxy substituted alkyl, and poly(ethylene glycol) having 1-10 repeating units.

30. The silicone hydrogel of claim 29 wherein $R_1$ is H or methyl, X is oxygen and R is selected from $C_2$-$C_4$ mono or dihydroxy substituted alkyl, and poly(ethylene glycol) having 1-10 repeating units.

31. The silicone hydrogel of claim 29 wherein $R_1$ methyl, X is oxygen and R is selected from $C_2$-$C_4$ mono or dihydroxy substituted alkyl, and poly(ethylene glycol) having 2-20 repeating units.

32. The silicone hydrogel of claim 1 wherein said hydroxyalkyl monomer is selected from the group consisting of 2-hydroxyethyl methacrylate, 2-hydroxyethyl acrylate, 3-hydroxypropyl (meth)acrylate, 2-hydroxypropyl (meth)acrylate, 1-hydroxypropyl-2-(meth)acrylate, 2-hydroxy-2-methyl-propyl (meth)acrylate, 3-hydroxy-2,2-dimethyl-propyl (meth)acrylate, 4-hydroxybutyl (meth)acrylate, glycerol (meth)acrylate, 2-hydroxyethyl (meth)acrylamide, polyethyleneglycol monomethacrylate, bis-(2-hydroxyethyl) (meth)acrylamide, 2,3-dihydroxypropyl (meth)acrylamide, and mixtures thereof.

33. The silicone hydrogel of claim 1 wherein said hydroxyalkyl monomer is selected from the group consisting of 2-hydroxyethyl methacrylate, glycerol methacrylate, 2-hydroxypropyl methacrylate, hydroxybutyl methacrylate, 3-hydroxy-2,2-dimethyl-propyl methacrylate, and mixtures thereof.

34. The silicone hydrogel of claim 1 wherein said hydroxyalkyl monomer comprises 2-hydroxyethyl methacrylate, 3-hydroxy-2,2-dimethyl-propyl methacrylate, glycerol methacrylate and mixtures comprising them.

35. The silicone hydrogel of claim 1 wherein said monofunctional polydialkylsiloxane monomer is selected from the group consisting of monomethacryloxypropyl terminated mono-n-butyl terminated polydimethylsiloxane, monomethacryloxypropyl terminated mono-n-methyl terminated polydimethylsiloxane, monomethacryloxypropyl terminated mono-n-butyl terminated polydiethylsiloxane, monomethacryloxypropyl terminated mono-n-methyl terminated polydiethylsiloxane, N-(2,3-dihydroxypropane)-N'-(propyl tetra(dimethylsiloxy) dimethylbutylsilane)acrylamide, α-(2-hydroxy-1-methacryloxypropyloxypropyl)-ω-butyl-octamethylpentasiloxane, and mixtures thereof.

36. The silicone hydrogel of claim 1 wherein said monofunctional polydialkylsiloxane monomer is selected from the group consisting of monomethacryloxypropyl terminated mono-n-butyl terminated polydimethylsiloxane, monomethacryloxypropyl terminated mono-n-methyl terminated polydimethylsiloxane, N-(2,3-dihydroxypropane)-N'-(propyl tetra(dimethylsiloxy) dimethylbutylsilane)acrylamide, and mixtures thereof.

37. The silicone hydrogel of claim 1 further comprising at least one crosslinking monomer.

38. The silicone hydrogel of claim 37 wherein said crosslinker is present in a molar concentration between about 0.6 to about 2.4 mmole/100 g reactive components.

39. The silicone hydrogel of claim 37 wherein said crosslinker is present in a molar concentration between about 0.6 to about 1.8 mmole/100 g reactive components.

40. The silicone hydrogel of claim 1 further comprising at least one photoinitiator.

41. The silicone hydrogel of claim 1 wherein said reaction mixture further comprises at least one UV absorbing compound.

42. The silicone hydrogel of claim 41 wherein said at least one UV absorbing compound is reactive.

43. The silicone hydrogel of claim 41 comprising between about 1 wt % and about 2 wt % UV absorber.

44. The silicone hydrogel of claim 37 wherein said reaction mixture further comprises at least one slow reacting crosslinker and at least one fast reacting crosslinker.

45. The silicone hydrogel of claim 44 wherein said at least one slow reacting crosslinker and at least one fast reacting crosslinker are each present in said reaction mixture in amounts between about 0.05 to about 0.3 wt %.

46. The silicone hydrogel of claim 44 wherein said at least one slow reacting crosslinker and at least one fast reacting crosslinker are each present in said reaction mixture in amounts between about 0.1 to about 0.2 wt %.

* * * * *

UNITED STATES PATENT AND TRADEMARK OFFICE
CERTIFICATE OF CORRECTION

PATENT NO. : 9,588,258 B2  
APPLICATION NO. : 13/720239  
DATED : March 7, 2017  
INVENTOR(S) : Alli et al.

Page 1 of 1

It is certified that error appears in the above-identified patent and that said Letters Patent is hereby corrected as shown below:

In the Claims

Column 35, Claim 22, Line 63:  
Delete "$R_4$ and $R_5$ are independently selected from . . ."  
Insert --$R_4$ and $R_8$ are independently selected from . . .--

Signed and Sealed this  
Twenty-fifth Day of April, 2017

Michelle K. Lee  
*Director of the United States Patent and Trademark Office*